United States Patent
Simpson-Young et al.

(10) Patent No.: US 6,910,627 B1
(45) Date of Patent: Jun. 28, 2005

(54) SMART CARD SYSTEMS AND ELECTRONIC TICKETING METHODS

(75) Inventors: William Simpson-Young, Eastwood (AU); Cathryn Anne Chamley, Eastwood (AU); Sue-Ken Yap, Love Cove (AU); Andrew Timothy Robert Newman, Surry Hills (AU); Stephen Robert Bruce, Abbottsford (AU)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 09/666,482

(22) Filed: Sep. 20, 2000

(30) Foreign Application Priority Data

Sep. 29, 1999 (AU) .............................. PQ3144
Sep. 29, 1999 (AU) .............................. PQ3146
May 8, 2000 (AU) .............................. PQ7363

(51) Int. Cl.[7] .............................................. G06F 7/08
(52) U.S. Cl. ...................................... 235/381; 235/380
(58) Field of Search ................................ 235/381, 380, 235/492; 705/5, 17

(56) References Cited

U.S. PATENT DOCUMENTS

| | | | | | |
|---|---|---|---|---|---|
| 4,904,853 A | * | 2/1990 | Yokokawa | .............. | 235/462.01 |
| 5,002,062 A | | 3/1991 | Suzuki | ........................ | 128/696 |

(Continued)

FOREIGN PATENT DOCUMENTS

| AU | 200053578 | 8/2000 | | |
|---|---|---|---|---|
| DE | 36 37 684 | 5/1987 | | |
| EP | 0 413 364 | 8/1990 | | |
| FR | WO 95/35534 | * 12/1995 | ........... | G06F/3/023 |
| JP | 59-123986 | 7/1984 | | |
| JP | 4-88547 | 3/1992 | | |
| JP | 08 287108 | 11/1996 | | |
| JP | U3071329 | 6/2000 | | |
| WO | 95/35534 | 12/1995 | | |
| WO | 00/11827 | 3/2000 | | |

OTHER PUBLICATIONS

International Search Report.
Australia Examiner's Report.

*Primary Examiner*—Thien M. Le
*Assistant Examiner*—Lisa M. Caputo
(74) *Attorney, Agent, or Firm*—Fitzpatrick, Cella, Harper & Scinto

(57) ABSTRACT

Disclosed is an electronic ticketing system (100, 200) and method (60) utilizing a smart card (31) The smart card can be loaded with pre-purchased tickets which are then booked at a subsequent date. Alternatively, the booking and payment for the ticket can be made at the one transaction. The smart card is customizable by a user (100) who would normally be a promoter or organizer of an event for which tickets are required. Also disclosed is a multiple purpose card (70, 91, 141, 151, 161) which is both a smart card having electronic data stored (78) therein and a conventional business card having information (72) printed thereon for use by a reader. The donee of the card is able to insert same into a card reader (12) to obtain detailed information from the computer (100) of the donor of the card. The multiple purpose smart card may also be used as a trading card (506) as part of a set (500) of similar cards each offering differing levels of user access to a database (526) related to the set.

25 Claims, 11 Drawing Sheets

U.S. PATENT DOCUMENTS

| | | | | |
|---|---|---|---|---|
| 5,353,016 A | | 10/1994 | Kurita et al. | 340/825.22 |
| 5,408,417 A | * | 4/1995 | Wilder | 235/381 |
| 5,461,222 A | * | 10/1995 | Haneda | 235/492 |
| 5,468,947 A | * | 11/1995 | Danielson et al. | 235/472.02 |
| 5,530,232 A | * | 6/1996 | Taylor | 235/375 |
| 5,601,489 A | | 2/1997 | Komaki | 463/44 |
| 5,662,332 A | | 9/1997 | Garfield | 273/308 |
| 5,689,561 A | | 11/1997 | Pace | 380/4 |
| 5,748,731 A | | 5/1998 | Shepherd | 380/4 |
| 5,832,463 A | * | 11/1998 | Funk | 235/375 |
| 5,901,067 A | * | 5/1999 | Kao et al. | 700/11 |
| 5,932,870 A | * | 8/1999 | Berson | 235/462.01 |
| 5,949,492 A | | 9/1999 | Mankovitz | 348/473 |
| 5,973,475 A | | 10/1999 | Combaluzier | 320/107 |
| 6,014,593 A | | 1/2000 | Grufman | 700/136 |
| 6,016,298 A | | 1/2000 | Fischer | 369/75.1 |
| 6,019,284 A | * | 2/2000 | Freeman et al. | 235/375 |
| 6,055,512 A | | 4/2000 | Dean et al. | 705/17 |
| 6,229,694 B1 | | 5/2001 | Kono | 361/683 |
| 6,422,462 B1 | * | 7/2002 | Cohen | 235/380 |

* cited by examiner

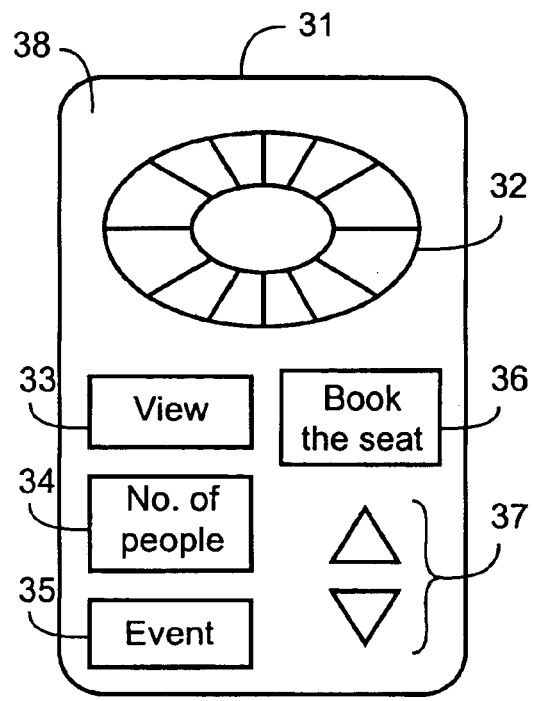
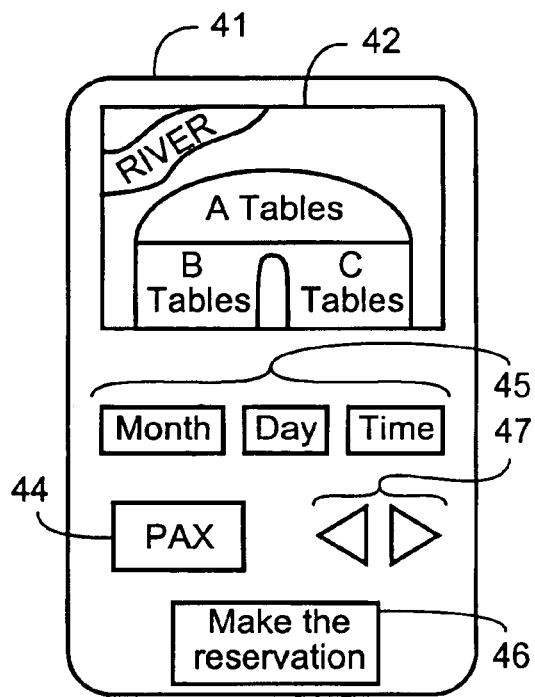
Fig. 3        Fig. 4
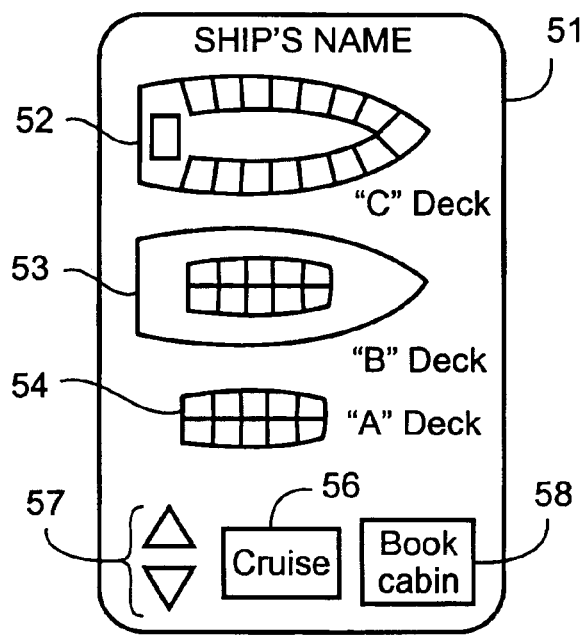
Fig. 5

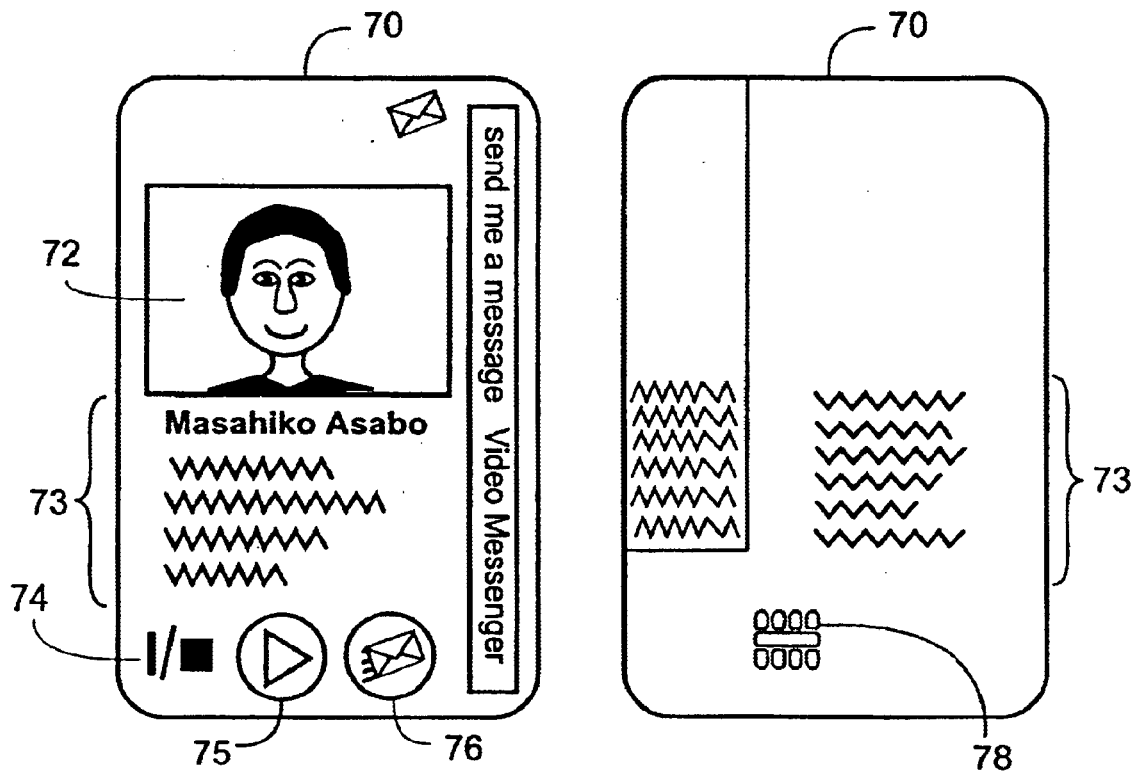
Fig. 7  Fig. 8
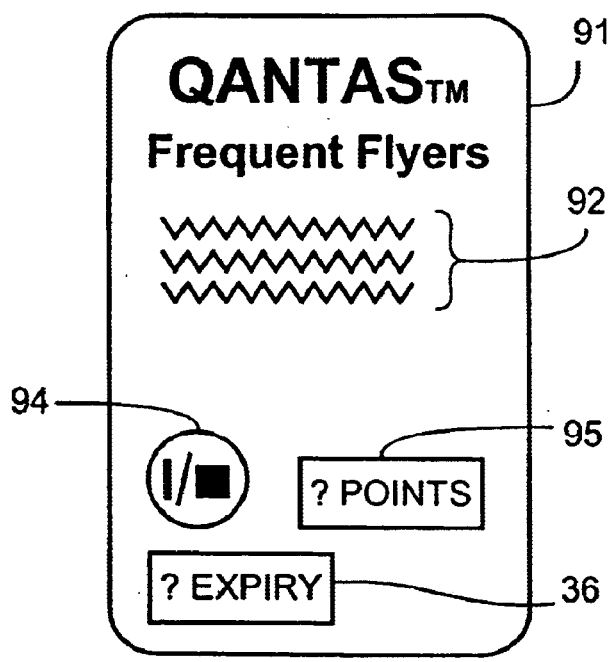
Fig. 9

SMART CARD SYSTEMS AND ELECTRONIC TICKETING METHODS

TRADEMARK ACKNOWLEDGMENT

TECHNICAL FIELD OF THE INVENTION

The present invention relates generally to smart cards and, in particular to electronic ticketing with smart cards and smart cards which having multiple functions.

BACKGROUND

In recent years, the rise of the Internet, automated telephone services, and other information services has been phenomenal. Information about every conceivable activity is available in large quantities.

The popularity and convenience of "shopping from home" has also increased. While home shopping has been available for many years in the form of "shopping channels" on broadcast or cable television, the presentation of information in such an environment is static, and cannot be tailored to the user's needs. The viewer is not able to return to a previous section of the program in order to review a demonstration of a particular feature of a product. A viewer may only be interested in a particular aspect of the product, but there is no way of choosing which aspects of the product are to be reviewed. In addition, it is difficult for the user to increase the speed of the transaction, since the information which is vital for the transaction (eg price, terms, etc) is often not available until late in the presentation of the product or service.

The rise of the Internet has solved some of these problems. Users are able to interact with on-line catalogues or shopping malls in a variety of ways. The Internet has fewer restrictions and permits a more user guided electronic shopping experience. However, with the meteoric rise of the Internet, another problem has occurred. With so many sites on the Internet, and so much information available, it is easy to become lost. If the location of a web or page (a URL or Uniform Resource Locator) is lost, it is unlikely that a user will "stumble across" the site again. The bookmarking facilities available with some web browsers have aided the management of URLs. However, these bookmarking facilities usually rely on textual information for identification of the URL. This can be inconvenient, since a user may not clearly remember the text associated with the page, but instead recall an overall "look" of the page, or recall the content of the page.

Another problem with electronic commerce sites on the Internet is that the navigation may not be obvious or intuitive. Also, this navigation cannot often be tailored to the needs of the individual. If an individual is interested only in certain aspects of the product or service, it can be quite frustrating to be forced to travel through various layers of web pages in order to reach the few details which are of significant interest. Access to Internet sites, particularly those from overseas, can be particularly slow, especially at times of peak usage. Access will also be slower if the site contains a lot of large graphics files, such as may be the case for an on-line catalogue. Thus, the use of data intensive (or "rich") types such as video is, in many cases, practically limited by the amount of bandwidth available to the typical user.

If a purchase is to be made via these web sites, it is often necessary to enter credit card details and identification details each time a purchase is made, for security purposes. This can be quite time consuming. Finally, in order to purchase goods via the Internet, a user must have access to a computer, and have an account with an Internet Service Provider (ISP). When the user desires to use an on-line ordering system on the Internet, he or she must go through the steps of turning on the computer, and connecting to the ISP, before any shopping can commence.

Digital television presents the opportunity for a rich interaction with the data and programs stored on a server, through the large bandwidth available to the digital television viewer. The so-called "set-top" box, necessary for decoding the digital television signals, is also able to control some interaction with the content shown on the digital television. By using a combination of set top box software, server side software, and the network, it is possible to provide many applications that can be used in the home, and which do not require expensive extra equipment. For example, systems for banking, weather updates, and stock market information are being developed for the digital TV market.

However, such information services, while useful, are not always easy to use. The interaction with the information service is limited, since the digital TV remote control was designed to perform a limited number of tasks, interaction with information services using a standard remote control can be complex, and non-intuitive.

Smart cards have been used in electronic commerce for some time. Simple smart cards incorporate memory device whereas advanced smart cards supplement the memory with a processing capability. Smart cards are capable of providing secure encryption of sensitive data, and of providing authentication of electronic transactions. Many other methods are also used for electronic payment, such as digital certificates, and digital cash. A number of these electronic payment techniques use a form of digital certificate which authenticates the user to a vendor, or a third party, where the third party is responsible for controlling the transaction between the vendor and the user. Once authenticated, the funds for the transaction are able to be received from a nominated bank account. In other methods, the digital certificate authenticates not the user, but a digital representation of funds, which is encapsulated by the digital certificate. Still other methods use smart cards to carry a representation of funds in digital form, known as digital cash or digital wallets.

Business cards are well known and almost all persons engaged in a business have a business card. Typically these are fabricated from cardboard and are very inexpensive, being intended to be given away by the person in business (the donor) to a prospective or existing customer (the donee). Traditionally the business card includes the name of the business person, their title, their educational qualifications, the company name, the address of their office, the contact details such as fax, telephone and e-mail, and like data relating to the donor. In recent times with the reduced cost of reproducing photographic images, very often a photograph of the donor is also provided in order to better refresh the memory of the donee whenever the donee views the business card.

Trading cards are well known, and are commonly bought, sold, traded and collected by many people. These cards are typically produced as sets of cards pertaining to a specific subject, and individual cards in a set typically contain information and images relating to different aspects of that particular subject. For example, a set of trading cards depicting a specific baseball team might have individual cards, each of which depicts a different member of the team. Similarly, a set of trading cards relating to a particular movie could consist of individual cards, each of which depicts a specific character from the movie. Trading cards have traditionally been physical cards, made of printed cardboard, plastic, paper or metal.

U.S. Pat. No. 5,689,561 (Pace) describes a computer-based trading card system which uses diskettes as an item which is traded between people. Each of the aforementioned diskettes contains a "key", which is used to unlock data from a compact disk memory (CD ROM), where the CD ROM is accessible across a communications network. The CD ROM contains data in effect corresponding to "cards" in a set of trading cards, and makes this data available to a trader having the aforementioned diskette, and the trader is able to store this data on a hard disk, typically of a local computer operated by the trader. After a single use, however, the key on the diskette is typically disabled permanently.

U.S. Pat. No. 5,748,731 (Shepherd) is directed towards "electronic trading cards" where individual encrypted electronic files represent virtual trading cards, and these files are decrypted by a user when the user has a corresponding decryption key.

Also currently available are various types of digital trading cards, which can be bought, sold, and swapped in "virtual" form, i.e., without involving a physical card or a physical medium having stored thereon an electronic version of the card. Examples of this genre include INZOMNIA® digital trading cards, and CYBERACTION® interactive digital trading cards.

In addition to being used for trading and collecting, trading cards can also be used for playing games. These include simple memory games, in which, for example, trading cards are placed face-down, and players attempt to find pairs of matching cards. More sophisticated strategy games are also possible. U.S. Pat. No. 5,662,332 (Garfield) is directed to game playing which involves use of trading cards as game components. In one version of this game, cards being used by a player can gain "energy", which allows the player to use the card to perform specific actions particular to the card in question. Garfield discloses the type of game, incorporating physical cards, as well as equivalent electronic components in computer games, interactive networks and other media.

Smart cards, as well as performing their conventional electronic purpose, can also be collected, traded and displayed in collections. Some types of smart card, such as phone cards, are printed with attractive pictures having different designs on different cards, and these are well suited to collecting and trading activities. When used electronically however, these cards are typically used for unrelated purposes, such as banking, access to public telephones and so on.

Physical trading cards typically have printed information concerning the relevant subject matter displayed on the card itself. Thus in one example, statistics relating to the particular baseball player who is pictured on the card can be printed on the card. In another example, a depiction of a game character can be printed on the card, as well as characteristics of the character. If an owner of such a trading card wishes to find out more information about the subject depicted on the card, the owner must typically access associated material in physical form, such as a related brochure. Alternatively, the owner may visit a "web site" which is identified on the card. The physical cards, in this case, can be implemented with a shape and functionality of a CD ROM, thereby being insertable into a CD ROM drive on a personal computer (PC). This facilitates access to network based associated information. POWER DECK® trading cards from UPPER DECK® use this aforementioned approach.

The need to insert the aforementioned type of CD ROM trading cards into a PC places a conceptual barrier between the user and the trading card environment, and attenuates the degree to which the trading card owner can relate to this environment.

In recent times, smart cards have been gaining commercial acceptance and the percentage of the population which has access to a smart card reader is steadily increasing.

SUMMARY

It is an object of the present invention to substantially overcome, or at least ameliorate, one or more deficiencies of prior art arrangements.

In accordance with one aspect of the present disclosure, there is provided a smart card for electronic ticketing, the smart card comprising:

a substrate;

an electronic memory associated with the substrate;

at least one first indicium on the substrate representing a venue to which tickets are to be sold;

a first data cache stored in the memory and representing displayable information regarding the venue;

at least one second indicium on the substrate representing time varying booking information;

a second data cache stored in the memory and pointing to a remote location at which current values of the booking information are stored;

at least one third indicium on the substrate representing a booking transaction; and a third data cache stored in the memory and comprising booking transaction enabling data.

In accordance with another aspect of the present disclosure there is provided a system for smart card electronic ticketing, the system comprising:

a smart card according to the first aspect;

a vendor computer arrangement comprising a base memory in which is stored booking information regarding the venue to which tickets are sold by a vendor, updating means to update the booking information during the progress of sales, and a vendor communications link; and a purchaser arrangement comprising a smart card reader, a purchasers communications link which can communicate with the vendor communication link, and a display coupled to the reader and purchaser communications link for displaying electronic ticketing information.

In accordance with another aspect of the present disclosure there is provided a method for smart card electronic ticketing, the method comprising the steps of:

a vendor preparing at least one smart card as claimed in claim 1;

distributing to a purchaser one of the smart cards;

the purchaser entering the smart card into a card reader arrangement and activating the at least one first indicium to thereby display to the purchaser a representation of the venue;

the purchaser activating the at least second indicium to have the card reader arrangement call and download from a vendor computer over a communications link current booking information regarding the venue and to display the booking information to the purchaser; and the purchaser activating the at least one third indicium to electronically perform a ticket booking transaction with the vendor, update the booking information in the vendor computer, and store the transacted ticket information in the smart card electronic memory.

In accordance with another aspect of the present disclosure there is provided a multiple purpose smart card for both noncomputer based and computer-based information transfer, the card comprising:

a substrate;

an electronic memory associated with the substrate;

a first set of indicia located on the substrate, visible to a human reader and conveying a first set of data relating to the donor of the card;

a second set of indicia located on the substrate and comprising a plurality of icons activatable by the donee of the card; and at least one of (i) a second set of data stored in the electronic memory means relating to the donor of the card, and (ii) pointing data stored in the electronic memory and pointing to a remote location at which a third set of data relating to the donor is stored;

wherein the card is insertable in a card reader associated with a computer based device, whereupon following activation of at least one of the icons at least part of the second data or third data is used to perform a function using the computer based device.

In accordance with another aspect of the present disclosure there is provided a multiple purpose smart card system, the system comprising:

at least one smart card device comprising a memory device within which is stored data relating to one or more computer interpretable functions represented by icons or indicia formed on a surface of the smart card;

a reader device into which the smart card is insertable, the reader device comprising a transparent touch panel configured to overlay the smart card when so inserted whereupon a user selection of any one of the icon or indicia through depression of the touch panel at a location above the one icon or indicia causes corresponding the data to be read from the memory device by the reader to implement a corresponding one of the functions;

the system being characterised by a keypad overlay, positionable above the touch panel, and when so positioned activating an alternate set of computer interpretable functions corresponding to a layout of indicia or icons presented on the overlay.

In accordance with another aspect of the present disclosure there is provided a smart card reader device comprising a transparent touch panel beneath which a smart card is positionable for user selection of at least one of a first set of computer interpretable functions related to data stored within the smart card, and a keypad overlay positionable over the touch panel for user selection of at least one of a second set of computer interpretable functions related to data stored within the reader device.

In accordance with another aspect of the present disclosure there is provided a multiple-purpose smart card system, comprising:

a plurality of smart cards forming a set related to predetermined information, each of the smart cards comprising:

(i) a user interface representing at least one part of, and facilitating access to at least another part of, the predetermined information;

(ii) smart card data associated with the user interface and readable to facilitate the access to the at least another part of the predetermined information;

a smart card reader for reading at least a portion of the smart card data from one the smart card in response to a user interaction with the corresponding the user interface to form an information request;

a database incorporating at least the another part of the particular information and responsive to the information request to output a predefined component of the predetermined information, whereupon the database correlates a collective functionality of the set to smart cards to provide access, using at least each of the plurality of smart cards, to an entirety of the another part of the predetermined information.

In accordance with another aspect of the present disclosure there is provided a method for trading smart cards in a smart card system, the system comprising:

a plurality of smart cards forming a set related to predetermined information, each the smart card comprising:

(i) a user interface representing at least one part of, and facilitating access to at least another part of, the predetermined information;

(ii) smart card data associated with the user interface and readable to facilitate the access to the at least another part of the predetermined information;

a smart card reader for reading at least a portion of the smart card data from one the smart card in response to a user interaction with the corresponding the user interface to form an information request;

a database incorporating at least the another part of the particular information and responsive to the information request to output a predefined component of the predetermined information, whereupon the database correlates a collective functionality of the set to smart cards to provide access, using at least each of the plurality of smart cards, to an entirety of the another part of the predetermined information;

the method comprising the steps of:

choosing one of the smart cards for possible trading;

ascribing, dependent upon the one part of the predetermined data of the chosen smart card, a card-based value;

assessing, dependent upon the corresponding the predefined component of the chosen smart card, an associated database-based value;

determining a composite smart card value, dependent upon the card-based value and the database-based value; and trading the chosen smart card dependent upon the composite smart card value.

In accordance with another aspect of the present disclosure there is provided a computer program product comprising a computer program for implementing a trading smart card system, each smart card having a programmable user interface the program comprising:

code for choosing a smart card for possible trading;

code for ascribing, dependent upon smart card data of the chosen smart card, a card based value;

code for assessing, dependent upon database data correlated with the smart card data, an associated database-based value, the database data being provided in response to a user interaction with the user interface;

code for determining a composite smart card value, dependent upon the card based value and the database-based value; and code for trading the chosen smart card dependent upon the composite smart card value.

In accordance with another aspect of the present disclosure there is provided a method of playing a collectible trading card game, the method comprising steps of:

(i) selecting a smart card from a plurality of collectible trading smart cards, each the smart card having a programmable user interface;

(ii) reading smart card data via a user interaction with the interface;

(iii) at least one of navigating, searching and exploring, dependent upon the user interaction, a database which is responsive to the smart card data; and (iv) accessing associated database data; whereby the method comprises, if the game objective is comparison of corresponding database data, a further step of:

(v) comparing the associated database data with corresponding database data for another smart card from the plurality of collectible trading smart cards.

DESCRIPTION OF THE DRAWINGS

At least one embodiment of the present invention will now be described with reference to the drawings in which:

FIG. 3 is a view of the front face of a smart card able to be operated with the systems of FIGS. 1 and 2;

FIG. 4 is a view of the front face of an alternative smart card;

FIG. 5 is a front view of a further alternative smart card;

FIG. 7 is a front view of a dual purpose smart card;

FIG. 8 is a view of the rear of the card of FIG. 7;

FIG. 9 is a front view of another dual purpose smart card;

DETAILED DESCRIPTION INCLUDING BEST MODE

The sale of tickets requires a vendor and a number of purchasers. Generally the purchasers will be members of the general public and the vendors will be the organisers of, or promoters of, sporting events, restaurants, travel groups, or any activity which requires a ticket or reservation to be made prior to undertaking the activity.

Figure 1:
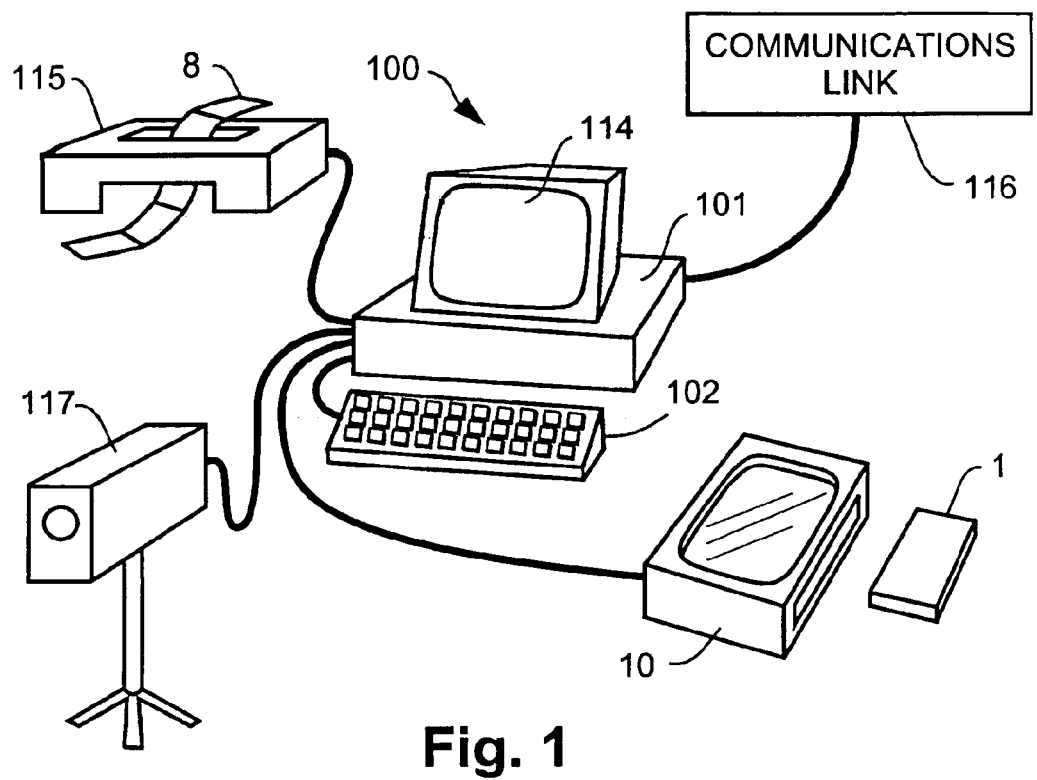
FIG. 1 is a schematic view of the computer system 100 operated by a vendor of smart cards.

Illustrated in FIG. 1 is a computer system 100 operated by the vendor. The system 100 includes a computer module 101 to which is connected a keyboard 102, a smart card programmer/reader 10 configured to program and read a smart card 1, a display 114, a printer 115, and a camera 117 which can be either a digital still camera or a digital video camera. The computer system 100 is also connected to a communications link 116 which can take various forms as will be described in more detail hereafter.

Figure 2:
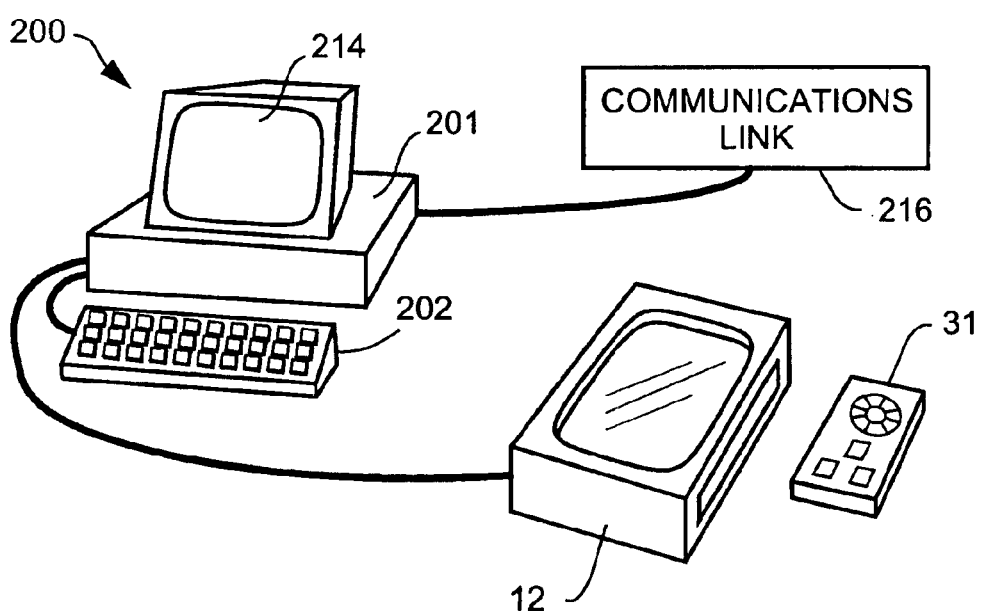
FIG. 2 is a similar view of a corresponding computer system 200 operated by a purchaser of smart cards.

Similarly, in FIG. 2 is schematically illustrated the computer system 200 available to the purchaser which includes a computer module 201, a keyboard 202, a display 214 and a communications link 216. Also connected to the computer module 201 is a smart card reader 12 complementing the programmer/reader 10.

FIG. 3 shows a smart card 31 which in this example is intended to be used to sell tickets to a sporting stadium. Located on the surface 38 of the smart card 31 is a stadium indicium 32, a view indicium 33, a number of people indicium 34, an event indicium 35, a "book the seat" indicium 36 and scroll indicia 37.

As is well known to those skilled in the art, the smart card 31 includes an inboard storage device (not illustrated) in the form of an integrated circuit which is able to store information corresponding to each of the indicia 32–37. When the smart card 31 is inserted into the smart card reader 12, pressing a transparent membrane located above the s smart card 31 at a point corresponding to a particular underlying indicium, activates the information in the corresponding portion of the electronic memory and sends a signal to the corresponding computer module 101 (or 201, etc as the case may be).

Initially the vendor has to both load a (blank) smart card 1 with the relevant data and also prepare the relevant indicia to appear on the smart card 1. The simplest way of preparation of such indicia is to utilise the printer 115 to print adhesive labels 8 which, after printing, are adhered to the corresponding smart card 1 as shown in FIG. 1 to produce the smart card 31 as illustrated in FIGS. 2 and 3 or, for example, the smart card 41 of FIG. 4.

In addition, the smart card 1 of FIG. 1 whilst in the programmer/reader 10 has downloaded to it various data to be described hereafter in more detail. Furthermore, the internal memory of the computer module 101 is also loaded with relevant data including images from the camera 117. Naturally the vendor manufactures a large number of such smart cards 1 which may then distributed, in one example without charge, one to each of a large number of prospective purchasers.

From the comfort of his own home and at a time of his own choosing, the purchaser can insert the smart card 31 into his card reader 12 and thereby utilise his computer system 200 to determine which events at the stadium he wishes to attend. By "depressing" the indicium 32 the user activates data within the smart card 31 which connects his computer 201 via the communications link 216 to the communications link 116 and thus to the vendor's computer 101. As a consequence, data is able to be downloaded to the purchaser's computer 201 which permits a plan of the stadium showing the various seats and their locations to be displayed on the display 214.

By activating the event indicium 35 the display 214 further indicates the dates and contesting teams of various football matches, for example, and by utilizing the scroll indicia 37 a particular event can be selected. As a consequence, the screen 214 then displays information from the computer module 101 as to the seats currently available for that particular event and the current price of the seats. Similarly, the scroll indicia 37 are able to be manipulated so as to move amongst the various seats and once a particular seat has been selected a view indicium 33 can be activated so as to display video images of the view from that particular seat of, say, a previous football match. In this way, the purchaser has an excellent idea as to the exact nature of the view able to be obtained from the particular seat.

By activating the "book the seat" indicium 36 and the number of people indicium 34, the purchaser is able to book a number of adjacent seats and conclude the relevant financial transaction. The tickets are able to be paid for using a number of standard payment types for electronic commerce, including but not being limited to, digital cash stored in electronic memory or credit card payments, for example where credit card details of the purchaser are stored on the purchaser's smart card 31, or on a separate smart card which operates from another terminal.

In an alternative arrangement, rather than the vendor distributing the smart cards 31 gratis, the smart cards 31 can be pre-loaded with a number of seats and/or events and sold to the purchaser prior to the purchaser deciding which of the events he wishes to attend. In this arrangement the selection of the seats and events is substantially the same, however in the transaction the action is the booking of a prepaid seat rather than the booking and payment of a seat.

FIG. 4 shows a smart card 41 distributed by a restaurant and contains an indicium 42 which is a plan of the restaurant showing "A" tables on a terrace alongside a river, "B" tablesat which are non smoking, and "C" tables at which smoking is permitted. As before, the purchaser installs the smart card 41 into the card reader 12 of his computer system 200 and by pressing the month, day and time indicia 45 is able to view the available unbooked tables at the restaurant. The number of persons (pax) for which the booking is to be made is entered by means of the pax indicium 44 and the scroll indicia 47. Finally activating the "make the reservation" indicium 46 enables a reservation to be made. In this transaction, the communications link to the restaurant's computer module 101 is made in order to ascertain which seats are available, however no financial transaction takes place until the restaurant is visited and the meal paid for.

Where a tourist agency or cruise ship operator is able to sell tickets to various cruises on a particular vessel, a smart card 51 of FIG. 5 is preloaded with data in relation to the vessel itself, its amenities, the proposed cruises to be held in the near future and so on. By pressing on the indicium 52 the nature of the accommodation available on "C deck" is displayed. By pressing on the indicium 53 the nature of the accommodation available on "B deck" is displayed. By pressing on the indicium 54 the nature of the accommodation available on the "A Deck" is displayed. Again pressing the cabin indicia results in a view of the type of cabin being displayed and other information as to amenities such as en suite toilet, bar fridge, etc. Other cruise specific information is also able to be displayed such as the ports of call, any day trips planned for the cruise, the entertainers booked for the cruise, and so on.

By pressing indicium 56 the connection to the vendor's computer 101 is made. This results in display of the available cabins for various cruises by scrolling through the screen display by means of indicia 57. A selection can then be made. Finally, after selecting a cruise and cabin preference the person is able to book a cabin of a specified type for a specified cruise by pressing the "book cabin" indicia 58. This then leads the purchaser through a series of electronic steps to finalise the booking including a means of electronic payment.

Figure 6:
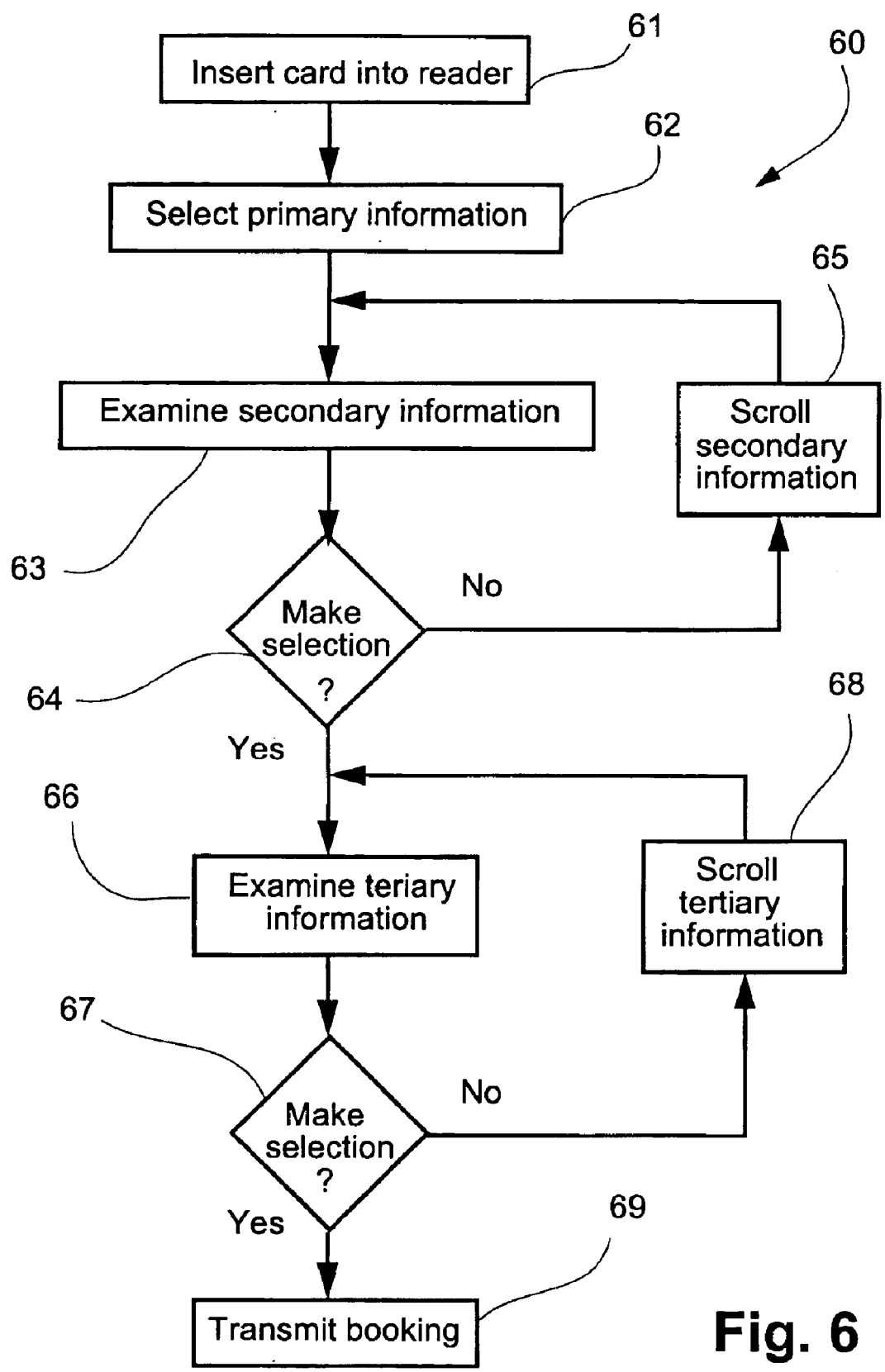
FIG. 6 is a flow chart depicting use of the smart card of FIGS. 3 to 5.

It will be apparent to those skilled in the art that the indicia provided on the smart card can be divided into three groups. The first group of indicia represents the physical area of the building or facility. The second group of indicia provide access to information about a specific portion of the physical area or premises which is time dependent depending upon the intended date or time of the proposed booking. The third indicia specifies the details for booking a ticket and performing the transaction. FIG. 6 shows a flow chart of the generalised procedures 60 performed when using the smart cards of FIGS. 3 to 5. In step 61, the user inserts the smart card into the reader and in step 62 is able to select primary information, for example the stadium, layout or restaurant layout. Information is then displayed and the user can then, in step: 63, examine this secondary information. Step 64 determines if a selection is made. If not, step 65 permits, where appropriate, scrolling the secondary information to make an appropriate selection. Where a selection is made in step 64, tertiary information is displayed and examined in step 66. Such information may include numbers of people for which a booking is intended. Scrolling of such information may again be performed via step 68. Once a selection is made in step 67, the user can select the transmission of the booking to the vendor in step 69. It will be appreciated that although FIG. 6 only depicts primary, secondary and tertiary levels of information, the number of such levels may be increased or decreased depending upon the particular service being offered.

It will also be appreciated that the smart cards 31, 41, 51 each constitute a customisable portable user interface and in addition to enabling the event to be booked can also constitute a ticket for entrance to the event. This is accomplished by storing in the smart card 31, 41, 51 the booking details finalised via the communication link 116, 216, necessitating that the system 200 include a programmer/reader 10, rather than merely a reader 12. If the purchaser then takes the smart card to the event and the event venue is itself provided with a smart card reader 12 and associated computer system, entry to the venue can be automatically gained by inserting the smart card 31, 41, 51 into the card reader 12 which then checks the booked details against a master list of all such bookings.

As seen in FIGS. 7 and 8, one example of a dual purpose card 70 is of substantially similar size and appearance to a conventional business card and, as depicted in FIG. 7, on the face thereof is a picture 72 of the donor. The card 70 includes text matter 73 such as title, address and telephone numbers etc traditionally found upon business cards. Also located on the front face are an on/off icon 74, a play icon 75 and a send message icon 76.

As seen in FIG. 8, located on the reverse side of the card 70 are the address and contact details of the donor and electrical contacts 78 which enable an integrated circuit (not illustrated but known in the art) located within the card 70 to make electrical contact after the card 70 has been inserted into a card reader 10, 12 such as those shown in FIGS. 1 and 2.

The computing equipment utilised with the dual purpose card 70 is illustrated in FIGS. 1 and 2 with the equipment utilised by the donor being illustrated in FIG. 2 and the equipment utilised by the donee being illustrated in FIG. 1 and the communications links 116 and 216 being coupled in a traditional manner.

In order to create stored information within the card 1, the donor records a video message via the video camera 117 which is then stored within the computer 101. Since the amount of storage within a typical smart card 1 is relatively small (typically 512 bytes) the card programmer/reader 10 is used to write the storage location of the video message within the computer 101 into the card 1 following its insertion into the card reader 10. As with the previously described arrangement, the printer 115 may be used to print labels 8 for application to each of the front and rear surfaces of the card 1 being programmed.

Once so formed, the card 70 is able to be given to the donee. If the donee does not have the requisite computer equipment available (ie. the reader 12), then the donee may uses the card 70 as a regular business card and simply uses the name and address and conventional contact details printed on the rear surface of the card 70 as a means by which the donee can contact the donor.

However, if the donee has the equipment illustrated in FIG. 2 available, the donee can insert the card 70 into the card reader 12 and press the on icon 74 and the play icon 75. As a consequence, the address of the video message recorded in the computer 101 will be transferred to the computer 201 which then connects, via the communications links 116 and 216 to the computer 101. The computer 101 then transfers the recorded video message to a video e-mail program stored in the computer 201. As a consequence the video e-mail message is displayed on the display 214 and is available to the donee to view whenever desired.

It will be appreciated by those skilled in the computing arts that if a video camera 117 is not available to the donor then the message may be purely audio. In the alternative, the message can also be typed via the keyboard 102 into the computer 101 and therefore constitute only a text or e-mail message.

It will be appreciated that whether the donor's business is selling services or selling products, or both, the message conveyed by the donee can be advertising, promotional information, and the like. The content of the message is limited only by the imagination of the donor and/or his advertising agency.

Turning now to FIG. 9, an example of a card 91 is illustrated. Here the business of the donor is operating a frequent flyer's point scheme for an airline, in this case QANTAS (registered trade mark). The front face of the card 91 is provided with the usual address information 92, and on/off icon 94, a points enquiry icon 95 and an expiry enquiry icon 96.

Prior to the card 91 being given to the frequent flyer member, the on-board memory of the card 91 has stored in it the membership number of the holder. At the member's home or business premises, the card 91 can be inserted into the card reader 12 and the on/off icon 94 pressed to activate the computer 201. As a consequence the membership number and contact details of the airline computer 101 are passed to the computer 201 which calls the airline computer 101 via the communications links 116 and 216.

When the airline computer 101 receives this information it completes the communications link between the two computers and in response to pressing of the points enquiry icon 95 is able to download to the computer 201 the number of points currently available for the frequent flyer. Similarly, if the expiry enquiry icon 96 is pressed then the information about the expiry dates of the currently available points is also downloaded to the computer 201. This information is displayed on the display 214 following its receipt by the computer 201.

Figure 10:
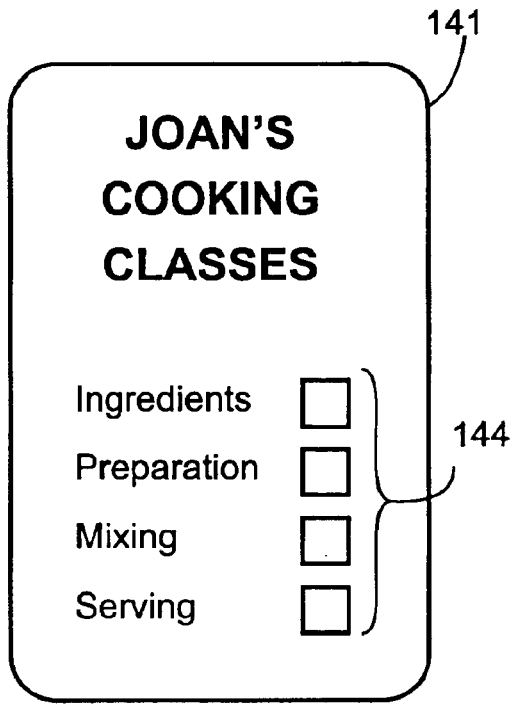
FIG. 10 is a front view of another dual purpose smart card.
Figure 11:
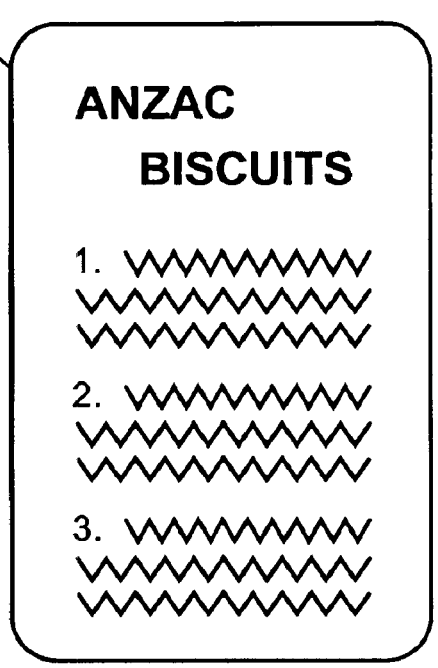
FIG. 11 is a rear view of the card of FIG. 10.

Turning now to FIGS. 10 and 11, a business card 141 of a further embodiment is illustrated, the front face being illustrated in FIG. 10 and the rear face being illustrated in FIG. 11. In this instance the business conducted by the donor is that of providing cooking classes and on the rear face as seen in FIG. 11 is a recipe for a particular type of biscuit (ANZAC biscuits). This is the information which is used by a donee who does not have a computer system available. However, where the donee does have an appropriate computer system available, insertion of the card 141 into the reader 12 enables information about the ingredients, preparation, mixing, serving, etc to be displayed on the display 214 as a result of pressing icons 144. This is an application in which the information about ingredients, preparation, etc is able to be of a sufficiently compact nature to be stored entirely within the electronic memory device carried by the card 141.

Figure 12:
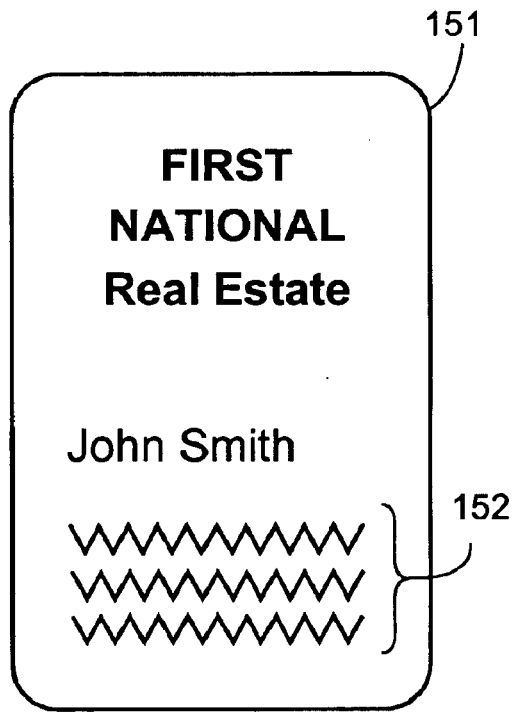
FIG. 12 is a front view of another dual purpose smart card.
Figure 13:
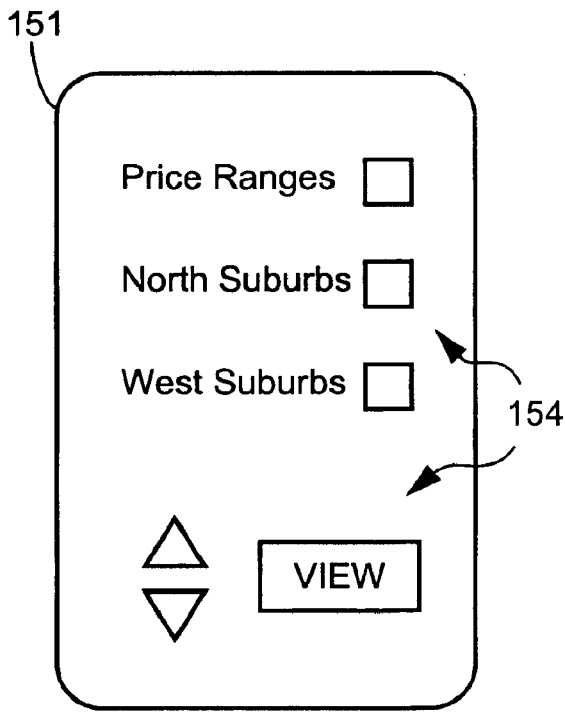
FIG. 13 is a rear view of the card of FIG. 12.

A further example is illustrated in FIGS. 12 and 13 which relates to real estate. The real estate card 151 is illustrated with its front face containing the usual address and contact information 152. As illustrated in FIG. 13, the rear face of the card 151 contains icons 154 which enable real estate information to be downloaded and browsed.

At present for both sale and lease real estate activity, many real estate agents provide information on the Internet as to the listings, even to the point of allowing an enquirer to view different rooms within a given property. However, in the real estate business the identification of a first introduction of a particular prospective purchaser or lessee to a particular premises is all important since it secures the right to commission by the real estate agent. A drawback of the Internet enquiry is that it is essentially anonymous and it is difficult for the real estate business to identify those persons who have enquired at the website of the real estate business. However, in accordance with the arrangement illustrated in FIGS. 12 and 13, stored within the electronic memory of the card 151 is a unique identifying number, or customer number, which indicates to the donor the identity of the donee. As a consequence, when the donee enquires via his computer 201 of the information stored in the donor's computer 101, the date and time of the enquiry and the identity of the prospective customer making the enquiry are able to be recorded in the computer 101. Therefore, should the donee approach several real estate agents in relation to the one (same) property, a method of verifying the time of approach is available and enables disputes about commission to be resolved.

Figure 14:
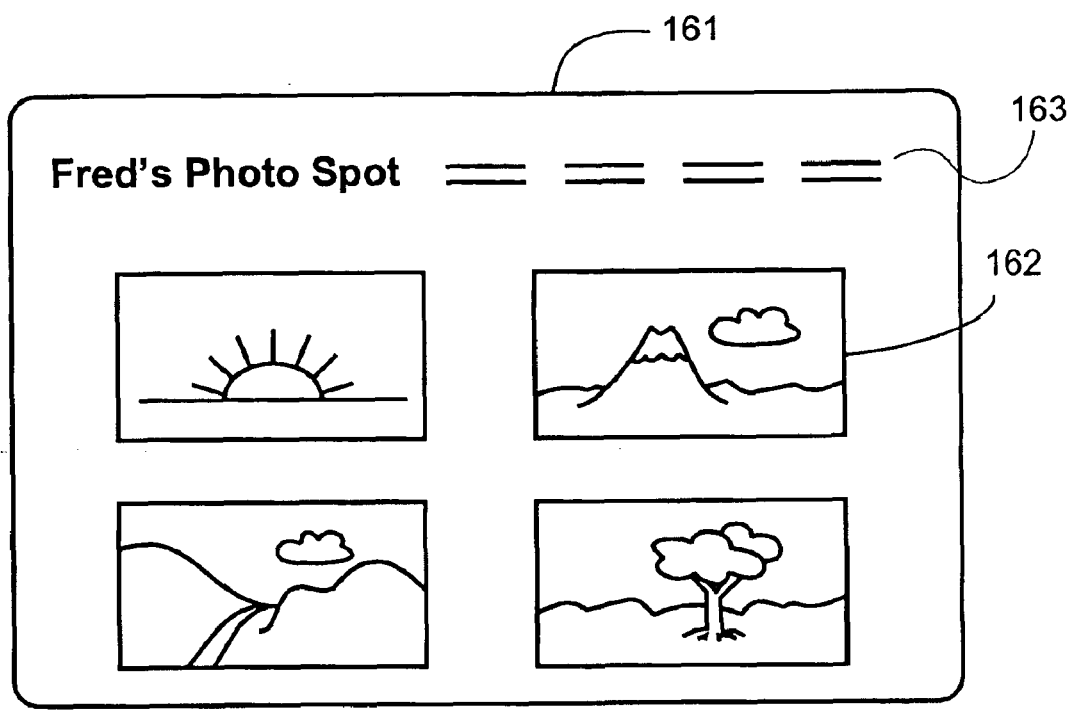
FIG. 14 is a view of the front face of another dual purpose smart card.
Figure 15:
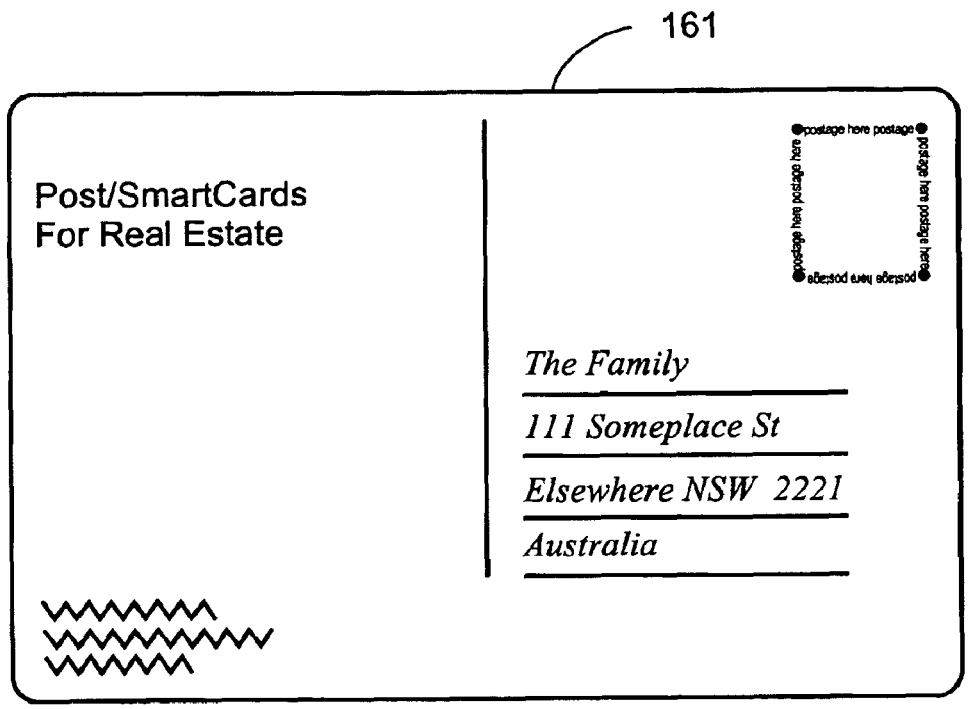
FIG. 15 is a view of the reverse side of the card of FIG. 14.

Turning now to FIGS. 14 and 15, a still further dual purpose business card 161 is illustrated. On the front face of the card illustrated in FIG. 14, in addition to the usual information 163 identifying the business of the donor, are set out a plurality of images 162 which depict scenic locations in the locality of the business. The rear surface of the card 161 is left substantially blank as illustrated in FIG. 15 and therefore the card 161 is able to be used as a conventional postcard. The card 161 may be given away as a promotion or may be purchased by the user. If the user sends the card, for example, to his mother who does not have the computer equipment illustrated in FIG. 2 available to her, then the user is able to record a handwritten message and the card functions substantially in the same way as a conventional postcard. However, should the user send the card to his sister who has the computer equipment illustrated in FIG. 2 available, then in addition to the written information on the rear surface of the card, the sister is also able to display on her computer 201 via the communications link 216, full size images on the display 214 corresponding to the various images 162. These images can be browsed, printed, etc.

Whilst the arrangements described with reference to FIGS. 7 to 15 are each described with reference to some form of business function, such is not essential and the dual purpose cards may be used complement a range of related activities. For example, the post card example of FIGS. 14 and 15 may be used to replace traditional post cards generally mailed in the course of an extended journey or holiday. Such a dual purpose card 161 may include brief notes written on the card 161 and one or more network references to one or more of text, static images, moving images and audio. Other dual purposes may include a limited menu for take-away food, perhaps including the culinary references of the bearer of the card.

Further, whilst in each of the arrangements described, the result of the electronic use of the card comprises a display to the user of certain information, such is also not essential. For example the card may be programmed with the telephone number of the donor, the card may be used to dial the telephone number of the donor and also, where desired by the donor, to display the number to the bearer of the card.

Figure 16:
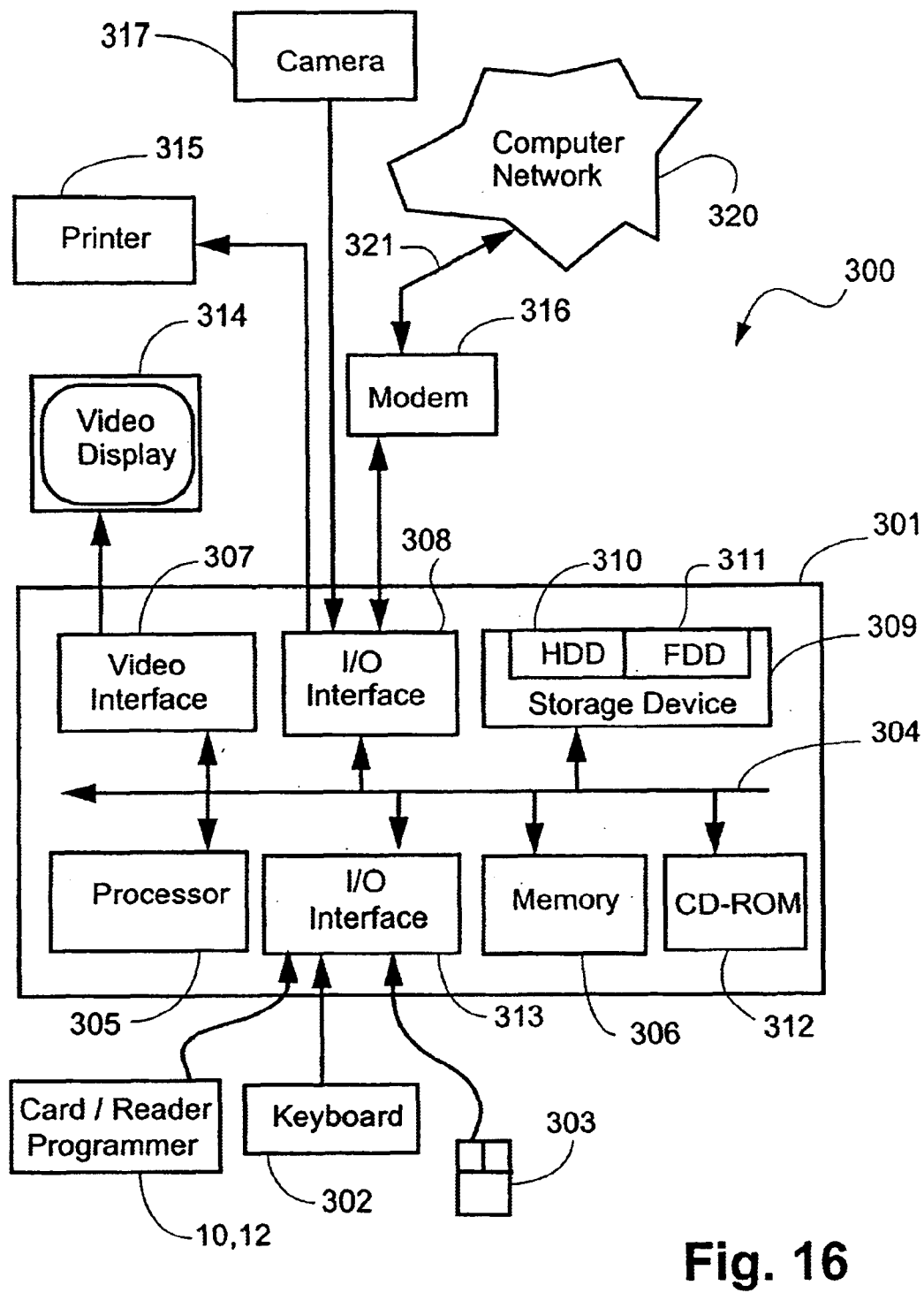
FIG. 16 is a schematic block diagram of the general purpose computer system with which the described arrangements may be performed.

FIG. 16 shows an arrangement of a general purpose computer system 300 which may be used, as required, as either of the systems 100 of FIG. 1 and/or 200 of FIG. 2, by the respectively described parties. The processes required to write data to, or read data from, the card are able to be implemented as software, such as an application program executing within the computer system 300. In particular, the steps of the method are effected by instructions in the software that are carried out by the computer 301. The software may be divided into two separate parts; one part for carrying out the methods; and another part to manage the user interface between the latter and the user. The software may be stored in a computer readable medium, including the storage devices described below, for example. The software is loaded into the computer form the computer readable medium, and then executed by the computer. A computer readable medium having such software or computer program recorded on it is a computer program product. The use of the computer program product in the computer preferably effects an advantageous apparatus for carrying out the embodiments of the invention.

The computer system 300 comprises a computer module 301, input devices such as a card reader/programmer 10, 12 a keyboard 302, mouse 303, and camera 317, output devices including a printer 315 and a display device 314. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keyboard 302, mouse 303, and card reader/programmer 10, 12 and an interface 308 for the printer 315, modem 316 and camera 317. A storage device 309 is provided and typically includes a hard disk drive 310 and a floppy disk drive 311. A magnetic tape drive (not illustrated) is also able to be used. A CD-ROM drive 312 is typically provided as a non-volatile source of data. The components 305–314 typically communicate via an interconnected bus 304 and in a manner which results in a conventional mode of operation of the computer system 300 known to those in the relevant art. Examples of computers on which the embodiments can be practised include IBM® personal computers (PCs) and compatibles, SUN SRARCSTATIONS® or alike computer system evolved therefrom.

Typically, the application program of the preferred embodiment is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program will be supplied to the user encoded on a CD-ROM or floppy disk and read via the corresponding drive 312 or 311, or alternatively may be read by the user from the network 320 via the modem device 316. Still farther, the software can also be loaded into the computer system 300 from other computer readable media including magnetic tape, a ROM or integrated circuit, a magneto-optical disk, a radio or infrared transmission channel between the computer module II and another device, a computer readable card such as a smart card, a PCMCIA card, and the Internet and Intranets including e-mail transmissions and information recorded on websites and the like. The foregoing is merely exemplary of relevant computer readable media. Other computer readable media are able to be practised without departing from the scope and spirit of the invention.

Figure 17:
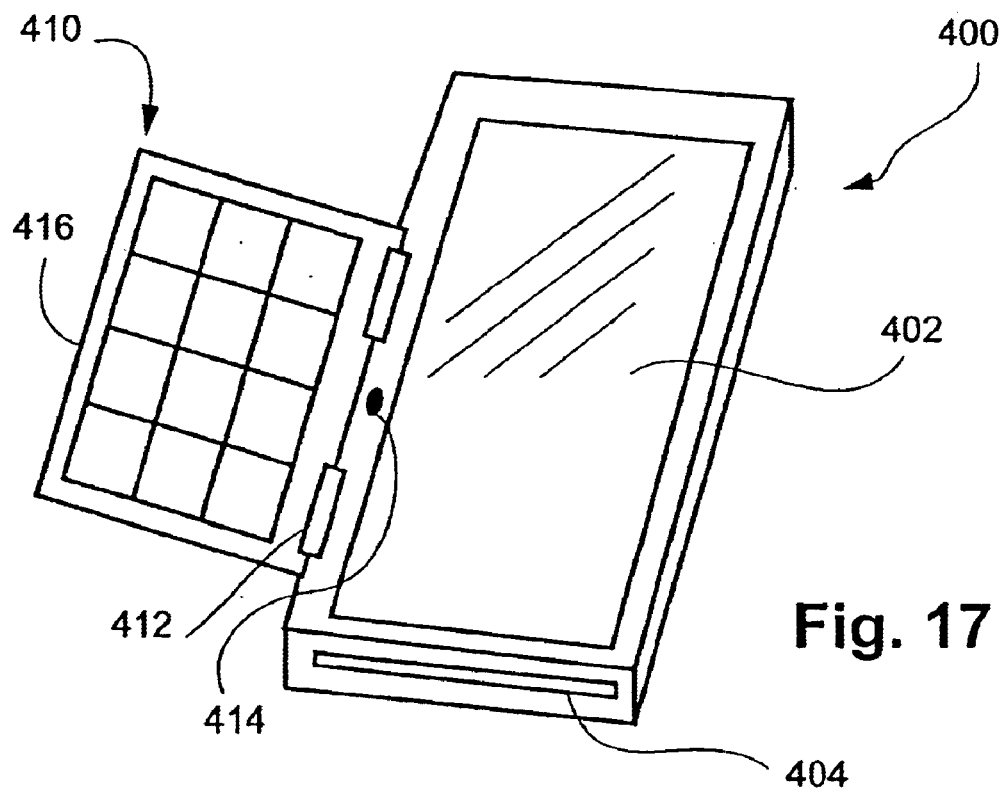
FIG. 17 illustrates an alternative smart card reader.

FIG. 17 shows a smart card reader 400 similar in configuration to the readers 10 and 12 in that the reader 400 includes a slot 404 into which a smart card such as those shown in FIGS. 3 to 5 or 7 to 15 may be inserted so that any icons or indicia formed on the surface thereof are visible through a transparent touch panel 402 overlying the inserted smart card. In this fashion, use of the inserted smart card may be achieved in the manner previously described by the user selecting a function corresponding to an icon or indicia through the depression of the touch panel 402 at a location above the icon or indicia.

Figure 18:
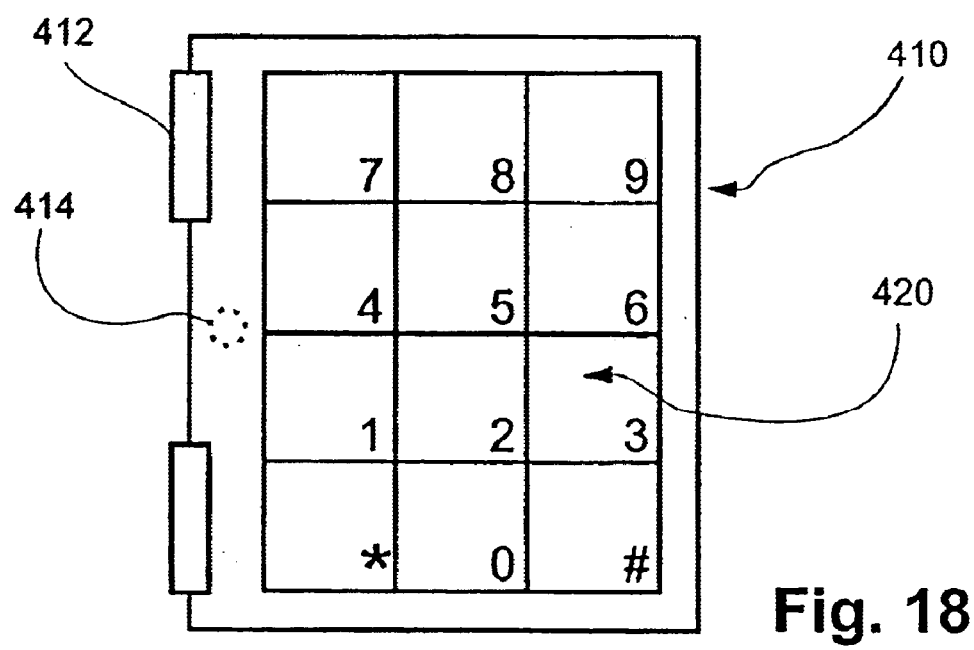
FIG. 18 shows the arrangement of the keypad overlay of the reader of FIG. 17.

Many applications for such smart cards involve the use of standard keypad layouts the incorporation of which as icons on the surface of the smart card may occupy valuable icon real estate. This deficiency is addressed in the arrangement of FIG. 17 through the reader 400 being configured with keypad overlay 410 formed as a flap 416 connected by means of hinges 412 to the body of the reader 400. A switch 414 is provided to detect those instances when the flap 416 is moved into an operative position above the touch panel 402. Alternatively, the switch may be formed within one of the hinges 412. When then flap 416 is hinged over the touch panel 402, a signal from the switch 414 disables the functions of any icons or indicia beneath the keypad overlay 410 and in turn activates a keypad interpretation of the touch panel 402 corresponding to a layout 420 of the keypad formed in the flap 416 as seen in FIG. 18. Such operation may be achieved using a "shifted" or alternate mapping table stored within the reader 400. Where appropriate, the layout 420 may be opaque so as to present to the user only that information contained in the layout 420 for interpretation. Further, whereas the layout 420 shows only a numeric keypad layout having two function buttons (# and *), other layouts may be used, for example alphanumeric layouts such as those commonly found on cellular mobile telephones and the like. Also, the hinged overlay 410 may be replaced by some other physical arrangements, such as a sliding shutter or door.

It will be appreciate from the foregoing that the arrangement of FIGS. 17 and 18 provides dual purpose functionality to be achieved when using an appropriately configured smart card. In this regard, it will be also appreciated that some smart cards may not be configured for such dual purpose and in such instance, if the overlay 410 where to be closed (ie. positioned over the touch panel 402), the standard functions of any underlying icons or indicia may be either maintained thereby causing the layout 420 to have no effect. Alternately, that portion of the touch panel 402 beneath the overlay 410 may be isolated and made inoperative prompting a message to the user, for example via the display 114, 214 that an invalid operations is being attempted. In a further configurations the smart cards of FIGS. 3 top 5 may be availed of a second function through use of the reader 400, the second function permitting extended alphanumeric data entry to confirm the booking being made.

Figure 19:
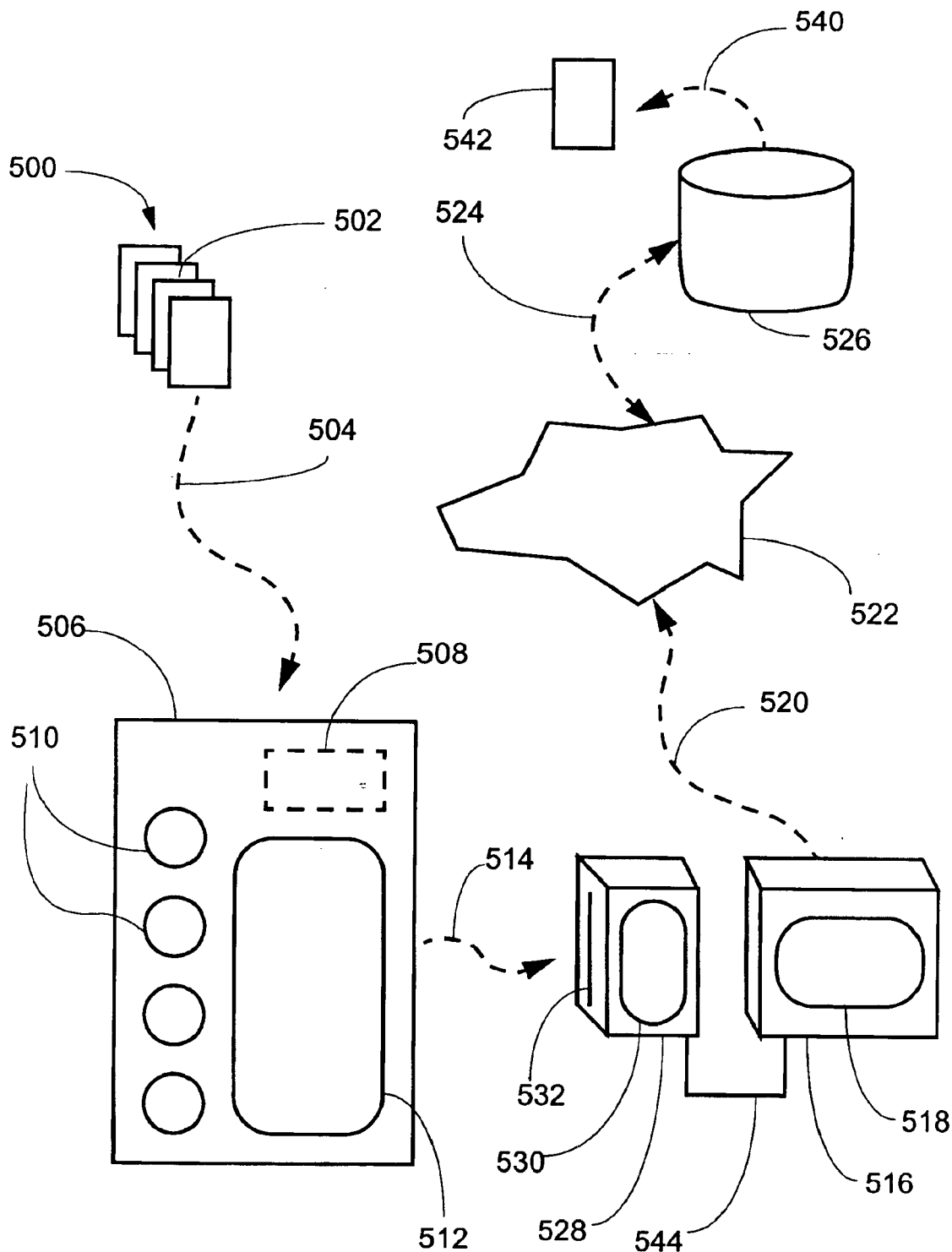
FIG. 19 is a representation of a trading card system formed using multiple purpose smart cards.

FIG. 19 shows a trading card system. The system includes a set of collectible trading smart cards 500, of which a particular smart card 502 is representative. As depicted by a dashed arrow 504, in a magnified form 506, the trading smart cards 500 each has an associated on-board memory 508 which in some instances may include a processing capacity and is typically formed or disposed on a surface of the card 506. In the present instance, the memory 508 is disposed on a rear surface of the card 506. The card 506 further comprises a number of "icons" or indicia 510, each of which being formed by a visually distinctive image, which can be either text, or graphic in nature. Furthermore, the card 506 has a larger image area 512, which comprises a mixture of text and/or graphic information, and typically relates to a key topic with which the card 506 is concerned.

Thus, in one particular example, the image region 512 may depict a famous baseball player, and the icon 510 contains the text, "scoring record" as well as other summary information regarding the particular player. In this case, the card 506 is a baseball trading card relating to a particular player, and the set of cards 500 is a corresponding set of baseball trading cards relating to the particular baseball team.

The set of trading cards 500 can be used in a traditional fashion, with cards being bought, sold, and swapped in accordance with their perceived "value", as measured by attributes associated with the physical cards themselves. This value is typically associated with the particular player featured on the card, as well as the attractiveness of the card to the traders involved, and in some instances the scarcity of the card.

In addition, however, the card 506 can be inserted, as depicted by a dashed arrow 514, into an access slot 532 of a smart card reader 528. When the card 506 is so inserted, the various icons (eg. 510) and visual information (eg. 512) are visible through an transparent touch panel 530 which is provided in the smart card reader 528. The smart card reader 528 as seen in FIG. 19 is connected, by a connection 544, to a processor 516 which has a display region 518. The processor 516 and display region may for example be formed by the computer system 300 of FIG. 16. The processor 516 is functionally connected to the card reader 528, and thereby has access to the card memory 508. Accordingly, the processor 516 is able to detect, and respond, to user interactions with the card 506, the user interactions with the card 506 typically being detected via depression of the touch panel 530 by the user at location corresponding to the desired icon 510. In this description, where the phrase "pressing or selecting an icon" is used, such is to be interpreted to mean the aforementioned pressing action by the touch panel 530 associated with the underlying icon formed on the surface of the smart card. Accordingly, a user can press on the icon 510 once the card 506 is inserted into the smart card reader 528, and the processor 516 is able to detect this user interaction, and to associate it with an interface description stored in the memory 508. The interface description defines an intended action which is to be associated with pressing the icon 510. The intended action, in the present case, is to search for relevant scoring data for the baseball player featured on the card 506. The processor 516 is interconnected, as depicted by a dashed arrow 520 to a communications network 522. In turn, a database 526 is connected, as depicted by a dashed arrow 524, to the network 522, and accordingly, the database 526 is accessible to the processor 516. The database 526 stores, as depicted by the line 540, database data 542 which is associated with the card 506.

In addition to the text and graphic information 510, 512 displayed on the physical card 506, an extended set of data, for example the data 542, is made available to the owner of the card 506 when the card 506 is inserted into the smart card reader 528. The combination of smart card data 512, 510, when considered in conjunction with the corresponding database data 542, forms an extended and enhanced collectible trading smart card data set. This significantly extends the perceived "trading card world" to which the trading card owner can relate.

Using the example of a set of baseball smart cards relating to a particular team, all information regarding the team and represented by information on the faces of all cards in the set and all information within the database may be considered a predetermined set of information. Further, some of that information may only appear on the faces of the cards, and not necessarily all cards, whereas much of the information would typically reside in the database and be selectably accessible to a trader in possession and operating particular cards in the set. For example, a card for Joe Bloggs an outfielder of the baseball team may be considered of little value and hence whilst the face of the card may provide brief biographical and statistical information regarding Bloggs, the portion of the database accessible using the card for Bloggs may only provide a small amount of further biographical and statistical information about only Bloggs. In contrast, a card for Todd Legend, captain of the baseball team and star pitcher, may be of high value and provide the user with access to all biographical and statistical information regarding all players in the team, including Bloggs. Other smart cards may be configured to provide access to historical information regarding the team and the club they represent. With differing levels of database access being ascribed to different cards, users have a means by which a collectible value may be assigned to each card.

It will be appreciated from this example that the configuration of the database to provide selective levels of access to holders of particular cards to the set of predetermined information, can create a situation where the perceived collectible value of a card may be created as a function of the quantity, and in some cases quality, of information made available to the user. Further, the operator of the database may influence the collectible value of the cards, for example as the baseball season progresses, to reflect the relative changes in performance of individual team members. For example, whereas the card for Legend may have high value at the commencement of the season, as acquired from the previous season's performance, a series of poor performances by Legend and good performances by Bloggs may prompt the database operator to reduce the data accessible for the Legend card and increase the data accessible by the Bloggs card. Further, where the cards of the team described above form a sub-set of all teams in the baseball competition, the relative value of cards of certain teams may be adjusted to track changes in the competition ladder.

The visual and user interface aspects of the trading cards can be customised, and need not be defined by the card manufacturer. This ability to customise is advantageous, since it places flexibility into the hands of the trading card supplier.

A card can be customised, for example, by inserting the card into a card reader/programmer which is connected to a personal computer (PC) running an appropriate software application. Customisation information can be provided by the trading card supplier, and consequently a programmed (customised) card is produced by the smart card programmer/reader. The card is customised both electrically, in terms of the interface descriptions associated with the various icons on the card surfaces, and also physically, in terms of the visual aspects and information printed or otherwise applied to the surface of the card 506.

Figure 20:
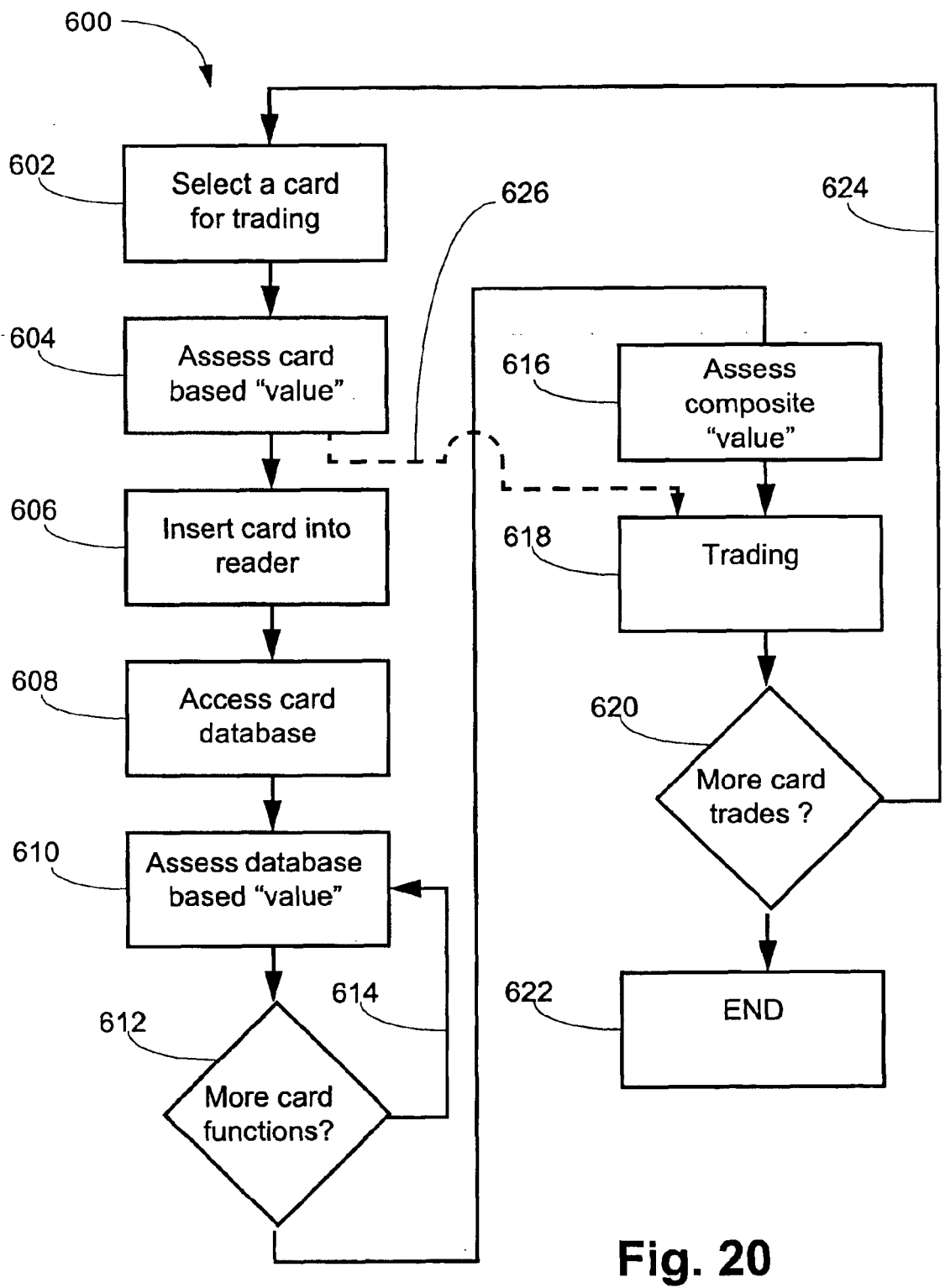
FIG. 20 is a flow chart of method steps by which trading cards of the system of FIG. 19 can be traded.

FIG. 20 is a flow chart of method steps by which the trading cards 500 may be traded. A trading process 600 commences with a selection step 602, in which a trader selects a card for consideration in a trading transaction. Thereafter, in a step 604, a card based value is assessed, this value being derived from information such as the icons 510 and images/text 512 on the physical card 506. This value forms one element of the overall value of the card 506.

Thereafter, in a step 606, the card in question is inserted into the smart card reader 528. In a following step 608, the associated database data 542 is accessed. The accessing of the associated database data 542 is performed by a judicious combination and/or sequence of user interactions with the icons 510 on the smart card 506 after insertion of the smart card 506 into the smart card reader 528. The user is able, by means of the icons 510, to access the associated set of data 542 which is effectively "coupled" to the particular smart card 506, and also to the set of smart cards 500 of which the smart card 506 is a member. In a following step 610, the database based "value" of the card 506 is assessed by the trader. The value ascribed in this regard by the trader to the card 506 will typically be based upon the richness of the database information that is accessible by means of the card 506, as well as other features relating to the manner in which the information 542 is configured, and other information configuration parameters. Thereafter, a testing step 612, the trader has the option of either partially, or fully, exercising the interactive capabilities of the card 506, this option being depicted by a looping arrow 614.

Once the trader has sufficiently assessed the database based value of the card in question, the process 600 is directed to an assessment step 616, in which a composite value for the card in question 506 is assessed. This composite value is the aggregate of the card-based value, and the database-based value.

A following trading step 618 crystallises the trading transaction, and the owner of the card 506 either trades the card, or maintains ownership, depending on trading terms offered by a respective "buyer".

The entire trading process 600 can be repeated if more card trades are desired, as depicted in a decision step 620. If such further trades are indeed desired, the trading process 600 is directed, in accordance with an arrow 624, back to the initial selection step 602. Alternatively, the trading process 600 is directed to a termination step 622.

The trading process 600 can also take an abbreviated form, in which the trader progresses directly from the card-based assessment step 604 to the trading step 618 as depicted by the interconnecting dashed arrow 626. Therefore, that the trading process is flexible, and not restricted to the particular depiction provided in FIG. 20.

Figure 21:
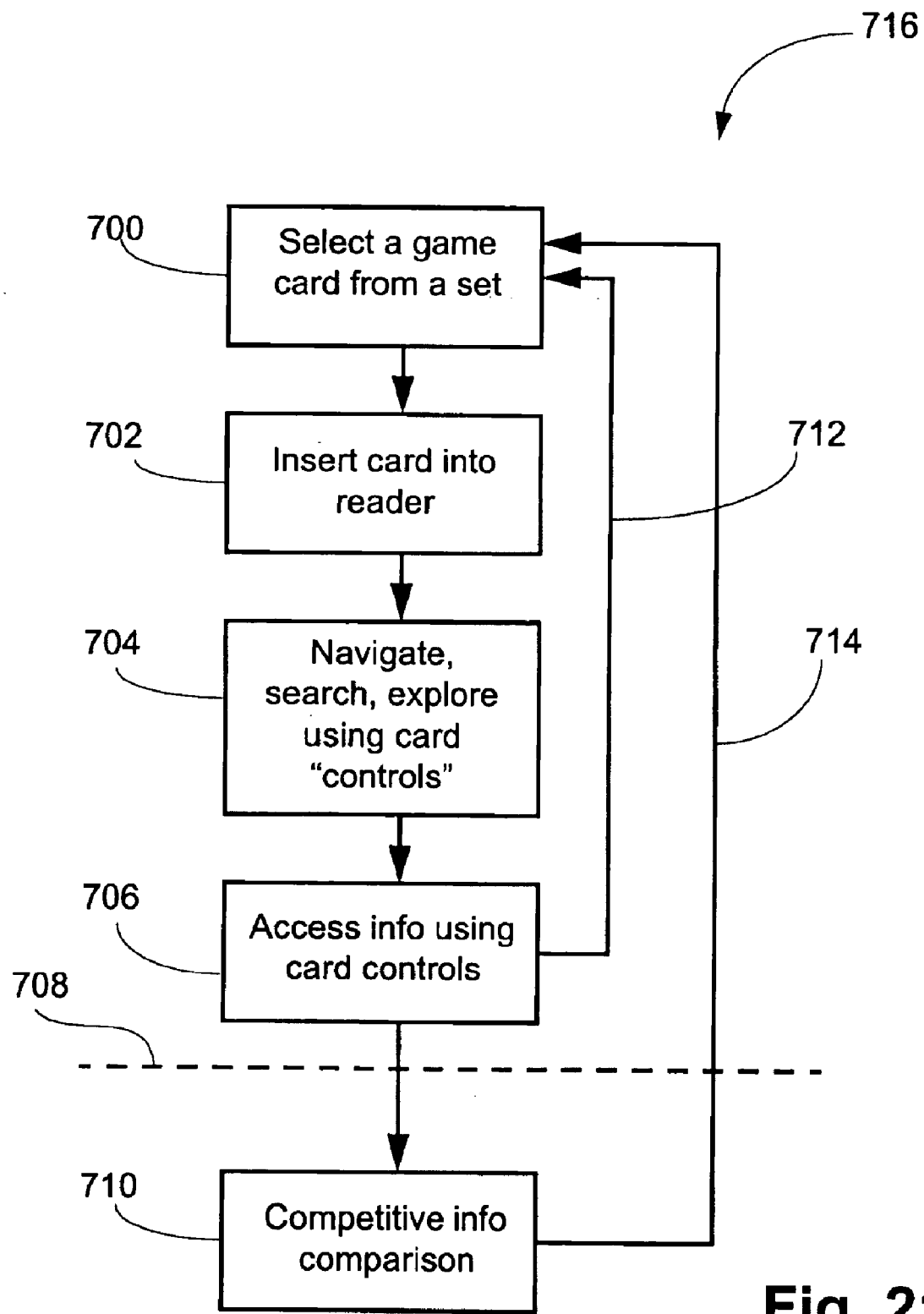
FIG. 21 is a flow chart of a method by which a game can be played using the trading cards.

FIG. 21 is a flow chart of method steps by which a game 716 can be played using the trading cards 500. The game 716 commences with a step 700 in which a player selects a "game" smart card from a set of game smart cards. It is to be appreciated that the set of trading cards 500 forms the set of game cards in the present instance, and the card being selected will, for example, be the card 506 from this set (see FIG. 19). Thereafter, the selected card 506 is inserted into a smart card reader in a step 702. The player is then able, in a step 704, to navigate a database (eg. 526 in FIG. 19) using card "controls", such as the icons 510. In a following step 706, database information 542 can be accessed using the aforementioned navigation as an access mechanism.

In configuration of the game 716, the player can loop, as depicted by an arrow 712, back to the initial selection step 700, for selection of a different card. In this example, a game objective is restricted to accessing and considering database data 542 associated with the selected card 506, such as might be the case with an adventure game which involves navigation from place to place with no further actions. In another example, the process 716 proceeds to a comparison step 710, in which accessed information for different cards in the set is compared. The various cards being compared are "played" by following an arrow 714 and subsequent steps 700 to 710, in a repeating sequence.

A dashed horizontal line 708 is used in FIG. 21 to indicate that the game process 716 can typically be played in a single, or a multi-player mode, if the step 710 is included. On the other hand, the game processes 716 lying above the dashed line 708 are typically played in single player mode.

The methods of trading collectible interactive trading smart cards, and/or playing a collectible interactive trading card game, are preferably practiced using the general purpose computer system 300, as shown in FIG. 16 wherein the processes of FIG. 20 or 21 may be implemented as software, such as an application program executing within the computer system 300. In particular, the steps of trading collectible interactive trading smart cards, and/or playing a collectible interactive trading card game, are effected by instructions in the software that are carried out by the computer.

Whilst the collectible nature of the smart cards described above have been illustrated with reference to baseball cards many other uses may apply. For example the described arrangements may be applied to other team sports such as basketball, soccer and rugby. Further sets of the business cards described above may be configured in a complementary manner, for example to access details on corporate performance to assist with the making of investment decisions. A further example relates to children's toys and games and to where a set of cards for a particular range of toy products, such a fighting characters, may be used to provide access to different levels of game complexity available from the database and played using the cards. For example "beginner" level fighting may be available on many cards, whereas "expert" level fighting may only be available on a few cards. As a consequence, the "expert" cards will attract a high trading value whereas the "beginner" cards will have low trading value. Such encourages users to trade the cards in order to progress through the various playing levels.

From the forgoing, it will be appreciated that disclosed are smart cards having multiple purposes, in some cases dual purposes and, in the case of a trading card possibly four purposes, those being a carrier of visual information, an access interface for, electronic information, an access interface for playing a game, an as a tradeable commodity. Other multiple purpose smart cards, namely smart cards which have a function in their own right, as well as an extended related functionality when inserted into a smart card reader which is appropriately connected to a network, fall within the scope of this disclosure. Examples of such include business cards, recipe cards (cards having a recipe displayed on the cards themselves, as well as providing access to interactive recipe information over a network), and hotel room key-cards (used in a physical sense for room entry, as well as for accessing room service over a network, and having an address of the hotel printed on the card, along with possibly a map of the hotel location). A further example are promotional cards, such as smart cards having pictures of products with an associated price and location of a sales outlet, while additionally having an on-line functionality related to purchase of products in an electronic-commerce context.

It will also be apparent, that although the game process 716 has been described in terms of a relatively "static" information comparison context, be it a single or multi-player competition, further implementations are possible within the scope of the present disclosure. Thus, for example, the smart card control icons 510 (see FIG. 19) can be used on an inserted smart card in the smart card reader 528 to play action games. These controls can initiate actions such as picking up objects, using objects, and performing physical actions with respect to other characters. The aforementioned objects are virtual objects as comprehended by the game player by means of a display. If a number of smart card readers are available, then multiple players can play these action games in a multi-player context.

Industrial Applicability

It is apparent from the above that the described arrangements are applicable to the business, entertainment, leisure and travel industries. It will also be apparent from the above that the arrangements described are applicable to a wide range of industries including industries involved in the sale of products as well as service industries involved in the provision of services and information.

The foregoing describes only some embodiments of the present invention, and modifications and/or changes can be made thereto without departing from the scope of the invention.

We claim:

1. A system for multiple purpose smart cards, the system including:
a card reader into which said smart card is insertable, said card reader having a pressure sensitive membrane through which at least textual information on a surface of an inserted smart card is visible, said textual information facilitating non-computer based information transfer to achieve a first pre-defined purpose;
said smart card which is adapted for both non-computer based and computer-based information transfer, the smart card comprising:
said textual information;
an electronic memory; and
data stored in the electronic memory enabling other information supplemental to the textual information to be presented, dependent upon pressure directed to the inserted smart card and exerted on said pressure sensitive membrane of the card reader;
said system further comprising:
presentation means communicating with said card reader for presenting the other information; and
a keypad overlay, positionable above said membrane of said card reader, and when so positioned activating an alternate set of computer interpretable functions corresponding to a layout of selectable indicia or icons presented on said overlay, wherein operation of the selectable indicia presented on said overlay is dependent upon pressure which is exerted on a selected indicium of said overlay being transferred to the pressure sensitive membrane, wherein
said additional information facilitates computer-based information transfer to achieve a second purpose; and
the first pre-defined purpose is facilitated based upon the textual information without reference to the additional information.

2. A system according to claim 1, wherein said overlay forms part of said card reader and is configured to be removably positionable above said membrane to enable user selection of one or more of said alternate set of computer interpretable functions.

3. A system according to claim 1, wherein said overlay comprises a flap hingedly connected to said card reader and associated with a switch configured to detect positioning of said flap over said membrane to thereby activate said alternate set of computer interpretable functions.

4. A smart card reader device for a multiple purpose smart card for both non-computer and computer-based information transfer, said card reader device comprising:
a pressure sensitive membrane through which textual information on a surface of an inserted smart card is visible, wherein said smart card comprises the textual information, an electronic memory, and data stored in the electronic memory enabling other information supplemental to the textual information to be presented, dependent upon pressure directed to the inserted smart card and exerted on said pressure sensitive membrane, said textual information facilitating non-computer based information transfer to achieve a first pre-defined purpose, wherein said supplemental information facilitates computer-based information transfer to achieve a second purpose, and the first pre-defined purpose is facilitated based upon the textual information without reference to the additional information; and
a keypad overlay positionable over said pressure sensitive membrane, wherein positioning the keypad overlay activates a set of computer interpretable functions related to data within said card reader device, the overlay keypad being adapted for user selection of a key of said keypad to thereby select at least one of said computer interpretable functions, wherein operation of the selectable key of said overlay is dependent upon pressure which is exerted on a selected key of said overlay being transferred to the pressure sensitive membrane.

5. A smart card for booking a desired one of plural selectable places at a venue, said smart card being constructed for insertion into a card reader which includes a pressure sensitive membrane through which an exposed top surface of an inserted smart card is visible, said smart card comprising:

at least one indicium on the exposed top surface of said smart card, said indicium having a plurality of portions having spatial correspondence to the selectable places at the venue; and an electronic memory which stores data enabling the desired place to be booked dependent upon pressure being exerted on the pressure sensitive membrane at a position over a corresponding portion of said indicium of the inserted smart card having spatial correspondence with said desired place, to thereby select said corresponding portion of said indicium on the inserted smart card, wherein said data includes a link to displayable information regarding a plan of a physical layout of said venue, said displayable information being supplemental to the information provided by said indicium.

6. The smart card as claimed in claim 5, wherein said indicium comprises a representation of said plan.

7. The smart card as claimed in claim 5, wherein said data includes a link to booking transaction data.

8. A system for smart card electronic ticketing, said system comprising:

a smart card as claimed in claim 5;

a vendor computer arrangement comprising a base memory in which is stored booking information regarding said venue to which tickets are sold by a vendor, updating means to update said booking information during the progress of sales, and a vendor communications link; and a purchaser arrangement comprising a smart card reader, a purchaser communications link which can communicate with said vendor communication link, and a display coupled to said reader and purchaser communications link for displaying electronic ticketing information.

9. The system as claimed in claim 8, wherein said smart card reader is located at said venue.

10. A method for smart card electronic ticketing, said method comprising the steps of:

a vendor preparing at least one smart card as claimed in claim 5;

distributing to a purchaser one of said smart cards;

said purchaser entering said smart card into a card reader arrangement and selecting the indicium to thereby book the desired place at the venue.

11. A multiple purpose smart card for both non-computer based and computer-based information transfer, the smart card being constructed for insertion into a card reader system, the card reader system including a pressure sensitive membrane through which an exposed top surface of an inserted smart card is visible, and presentation means for presenting additional information to a user of the card reader system, said smart card comprising:

textual information configured on the exposed top surface, said textual information for facilitating non-computer based information transfer to achieve a first pre-defined purpose;

plural indicia configured on the top exposed surface, each indicium having at least one selectable portion associated therewith; and an electronic memory which stores data enabling additional information supplemental to the textual information to be presented on the presentation means, dependent upon pressure being exerted on the pressure sensitive membrane at a position over the selectable portion of one of said indicia, to thereby select the selectable portion of said indicium on the inserted smart card, wherein said additional information facilitates computer based information transfer to achieve a second purpose; and the first pre-defined purpose is facilitated based upon the textual information without reference to the additional information.

12. The card as claimed in claim 11, wherein said data comprises a link to the additional information, and the additional information comprises a supplemental text message supplementing said textual information.

13. The card as claimed in claim 12, wherein the additional information is the textual information in machine-readable form.

14. The card as claimed in claim 11, wherein said data comprises a link to the additional information, and the additional information comprises a supplemental audio voice message supplementing said textual information.

15. The card as claimed in claim 11, wherein said data comprises a link to the additional information, and the additional information comprises a supplemental video message supplementing said textual information.

16. The card as claimed in claim 11, wherein said data comprises a link to the additional information, and the additional information comprises supplemental name and contact information supplementing said textual information.

17. The card as claimed in claim 11, wherein said data comprises a link to the additional information, and the additional information comprises a supplemental business activity supplementing said textual information.

18. A system for multiple purpose smart cards in which each such smart card is adapted for both non-computer based and computer-based information transfer, said system comprising:

said smart card comprising:

textual information configured on an exposed top surface, said textual information for facilitating non-computer based information transfer to achieve a first pre-defined purpose;

plural indicia on the exposed top surface, each indicium having at least one selectable portion associated therewith; and an electronic memory which stores data enabling additional information supplemental to the textual information to be presented, said system further comprising:

a card reader into which said smart card is insertable, the card reader having a pressure sensitive membrane through which the textual information and the indicia are visible; and presentation means communicating with the reader for presenting the additional information, dependent on pressure exerted on the pressure sensitive membrane at a position over a selectable portion of one of the indicia, to thereby select the selectable portion of indicium on the inserted card, wherein said additional information facilitates computer-based information transfer to achieve a second purpose; and the first pre-defined purpose is facilitated based upon the textual information without reference to the additional information.

19. A method for presenting information using a multiple purpose smart card adapted for both non-computer based and computer-based information transfer, wherein the smart card comprises both textual information and plural indicia on an exposed top surface thereof, each indicium having at least one selectable portion associated therewith, and an electronic memory which stores data enabling additional information supplemental to the textual information to be presented, wherein said method comprises the steps of:

facilitating, using the textual information configured on the exposed top surface, non-computer based information transfer to achieve a first pre-defined purpose; and, in the case that computer-based information transfer to achieve a second purpose is to be facilitated using said additional information, the method comprises the further steps of:

inserting the smart card into a card reader having a pressure sensitive membrane through which the textual information and the indicia are visible;

exerting pressure on the pressure sensitive membrane at a position over a selectable portion of one of the indicia, to thereby select the selectable portion of the indicium of the inserted card; and presenting the additional information on a presentation means communicating with the card reader, wherein said additional information facilitates said computer-based information transfer to achieve the second purpose, wherein the first pre-defined purpose is facilitated based upon the textual information without reference to the additional information.

20. A computer program for directing at least one processor to execute a procedure for presenting information using a multiple purpose smart card adapted for both non-computer based and computer-based information transfer, wherein the smart card comprises both textual information and plural indicia on an exposed top surface thereof, each indicium having at least one selectable portion associated therewith, and an electronic memory which stores data enabling additional information supplemental to the textual information to be presented, wherein non-computer based information transfer to achieve a first pre-defined purpose can be facilitated using the textual information configured on the exposed top surface, said computer program comprising:

code for establishing, in the case that computer-based information transfer to achieve a second purpose is to be facilitated using said additional information, communication between said smart card and a card reader into which the smart card is inserted, the card reader having a pressure sensitive membrane through which the textual information and the indicia are visible; and code responsive to pressure exerted on the pressure sensitive membrane at a position over a selectable portion of one of the indicia, for presenting the additional information on a presentation means communicating with the card reader, wherein the first pre-defined purpose is facilitated based upon the textual information without reference to the additional information.

21. A computer readable medium having a computer program recorded thereon for directing at least one processor to execute a procedure for presenting information using a multiple purpose smart card adapted for both non-computer based and computer-based information transfer, wherein the smart card comprises both textual information and plural indicia on an exposed top surface thereof, each indicium having at least one selectable portion associated therewith, and an electronic memory which stores data enabling additional information supplemental to the textual information to be presented, wherein non-computer based information transfer to achieve a first pre-defined purpose can be facilitated using the textual information configured on the exposed top surface; said computer program comprising:

code for establishing, in the case that computer based information transfer to achieve a second purpose is to be facilitated using said additional information, communication between said smart card and a card reader into which the smart card is inserted, the card reader having a pressure sensitive membrane through which the textual information and the indicia are visible; and code responsive to pressure exerted on the pressure sensitive membrane at a position over a selectable portion of one of the indicia, for presenting the additional information on a presentation means communicating with the card reader, wherein the first pre-defined purpose is facilitated based upon the textual information without reference to the additional information.

22. A smart card reader for a smart card having indicia on a surface thereof, said reader comprising:

a slot into which the smart card is inserted;

a transparent panel through which the indicia of the inserted smart card are visible;

a detector which detects a point where the transparent panel is pressed;

a keypad, having a plurality of textual information thereon, which is positionable above said transparent panel; and a processor which outputs keypad information relevant to a textual information on said keypad corresponding to the point detected by said detector when said keypad is positioned above said transparent panel, and indicia information relevant to the indicia on said surface corresponding to the point detected by said detector when said keypad is not positioned above said transparent panel.

23. A smart card reader according to claim 22, wherein said processor reads indicia information from a memory of the inserted smart card, and outputs the read indicia information to an external apparatus.

24. A smart card reader according to claim 23, further comprising a storage which stores a plurality of keypad information, wherein said processor reads keypad information from said storage and outputs the read keypad information to the external apparatus.

25. A smart card reader according to claim 22, wherein the plurality of keypad information includes at least two function buttons.

* * * * *

UNITED STATES PATENT AND TRADEMARK OFFICE
CERTIFICATE OF CORRECTION

PATENT NO. : 6,910,627 B1 Page 1 of 1
APPLICATION NO. : 09/666482
DATED : June 28, 2005
INVENTOR(S) : William Simpson-Young et al.

It is certified that error appears in the above-identified patent and that said Letters Patent is hereby corrected as shown below:

On the title page: Item
(75) Inventors:
"Andrew Timothy Robert Newman, Surry Hills (AU)" should read --Andrew Timothy Robert Newman, Glebe (AU)--.

SHEET 3:
Figure 6, "teriary" should read --tertiary--.

COLUMN 1:
Line 10, "having" should read --have--.

COLUMN 4:
Line 9, "SRARCSTATIONS®" should read --SPARCSTATIONS®--.

COLUMN 6:
Line 41, "Bloggs" should read --Bloggs,--.
Line 42, "team may" should read --team, may--.

Signed and Sealed this

Fourteenth Day of November, 2006

JON W. DUDAS
*Director of the United States Patent and Trademark Office*